(12) United States Patent
Arai

(10) Patent No.: US 9,142,068 B2
(45) Date of Patent: Sep. 22, 2015

(54) AIRBAG CONTROL UNIT

(71) Applicant: Bosch Corporation, Tokyo (JP)

(72) Inventor: Kenji Arai, Kanagawa (JP)

(73) Assignee: Bosch Corporation, Tokyo (JP)

( * ) Notice: Subject to any disclaimer, the term of this patent is extended or adjusted under 35 U.S.C. 154(b) by 0 days.

(21) Appl. No.: 14/084,856

(22) Filed: Nov. 20, 2013

(65) Prior Publication Data

US 2014/0142812 A1  May 22, 2014

(30) Foreign Application Priority Data

Nov. 22, 2012 (JP) ................. 2012-256473

(51) Int. Cl.
*B60R 21/01* (2006.01)
*G07C 5/08* (2006.01)
*B60R 21/017* (2006.01)

(52) U.S. Cl.
CPC ............ *G07C 5/085* (2013.01); *B60R 21/0173* (2013.01)

(58) Field of Classification Search
CPC ............................ G07C 5/085; B60R 21/0173
See application file for complete search history.

(56) References Cited

U.S. PATENT DOCUMENTS

| 6,016,104 A * | 1/2000 | Dobler et al. ................. 340/646 |
| 7,890,232 B2 * | 2/2011 | Komaki et al. ................. 701/45 |
| 8,103,413 B2 * | 1/2012 | Tanaka ............................ 701/45 |
| 2006/0025897 A1 * | 2/2006 | Shostak et al. .................... 701/1 |

FOREIGN PATENT DOCUMENTS

| JP | 2002037014 | 2/2002 |
| JP | 2004291673 | 10/2004 |
| JP | 2005041273 | 2/2005 |

* cited by examiner

*Primary Examiner* — John Q Nguyen
*Assistant Examiner* — Alan D Hutchinson
(74) *Attorney, Agent, or Firm* — Michael Best & Friedrich LLP

(57) ABSTRACT

An airbag ECU includes a voltage detection section that detects a voltage in a power supply supplied to other control units (for example, front passenger seat occupancy sensing ECU). In addition, the airbag ECU includes a timer that measures an elapsed time after the voltage detected by the voltage detection section falls in a preset voltage range and a recording section that records the elapsed time measured by the timer on a memory when a failure of the other control units is detected.

10 Claims, 23 Drawing Sheets

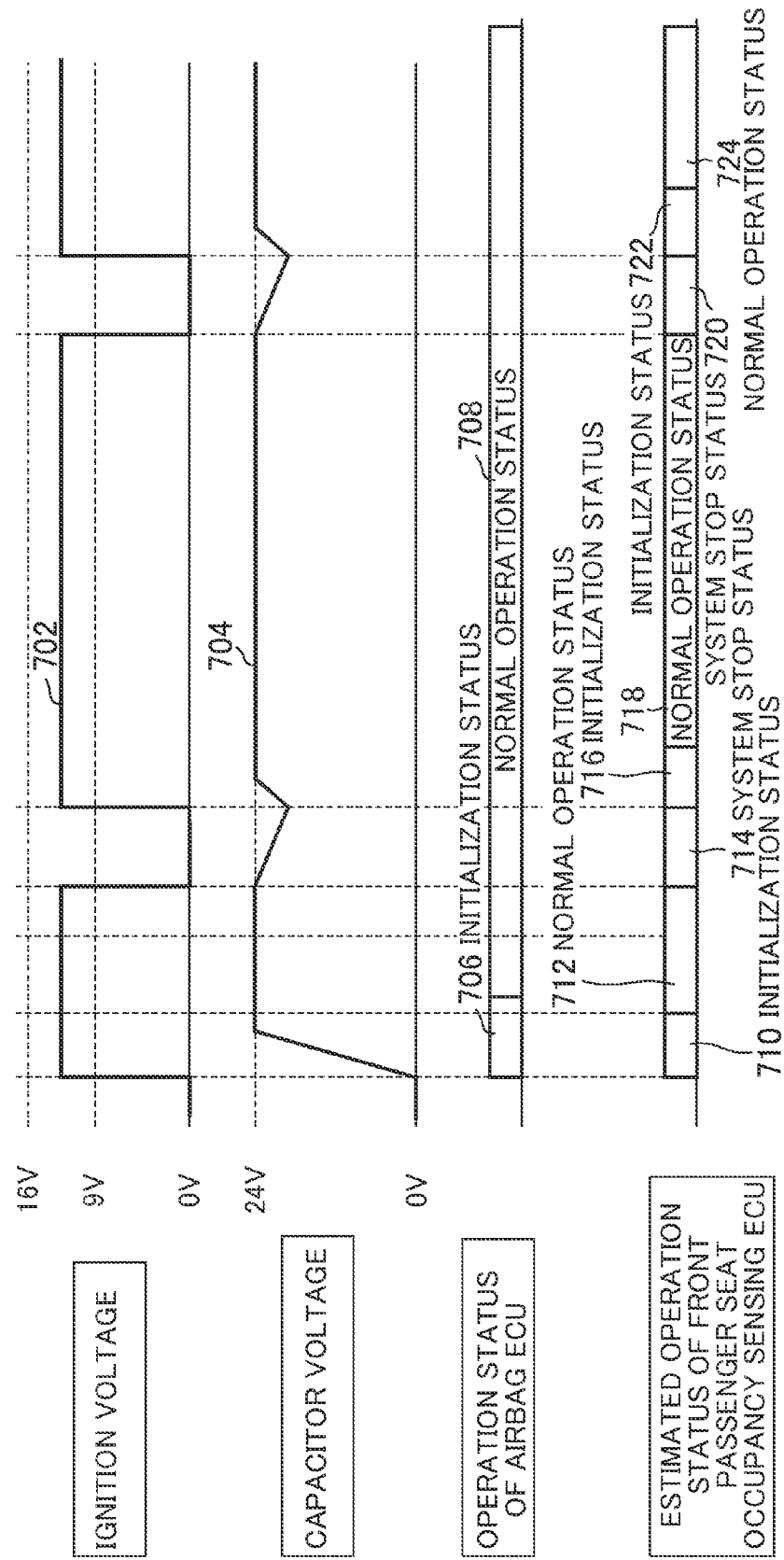

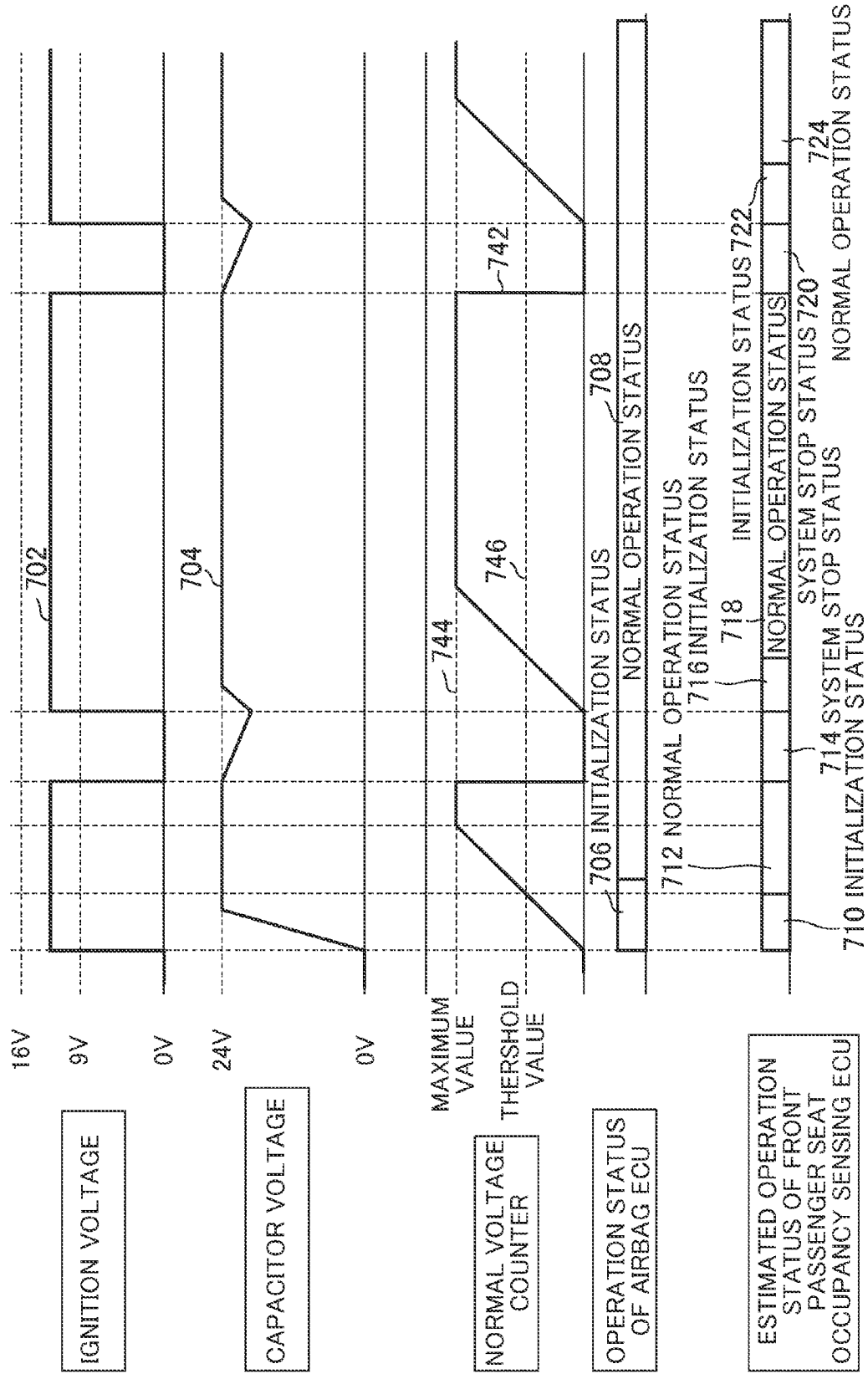

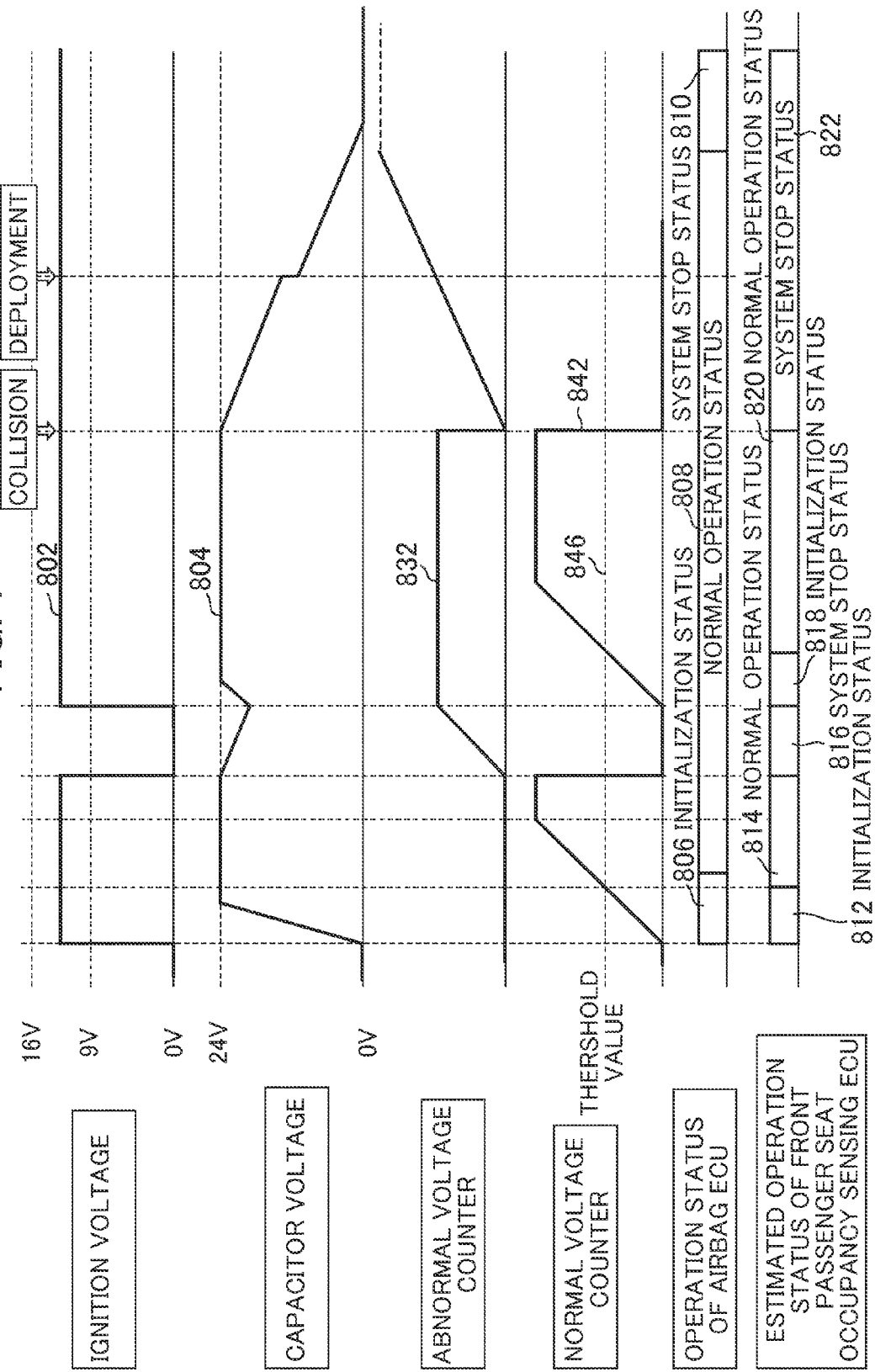

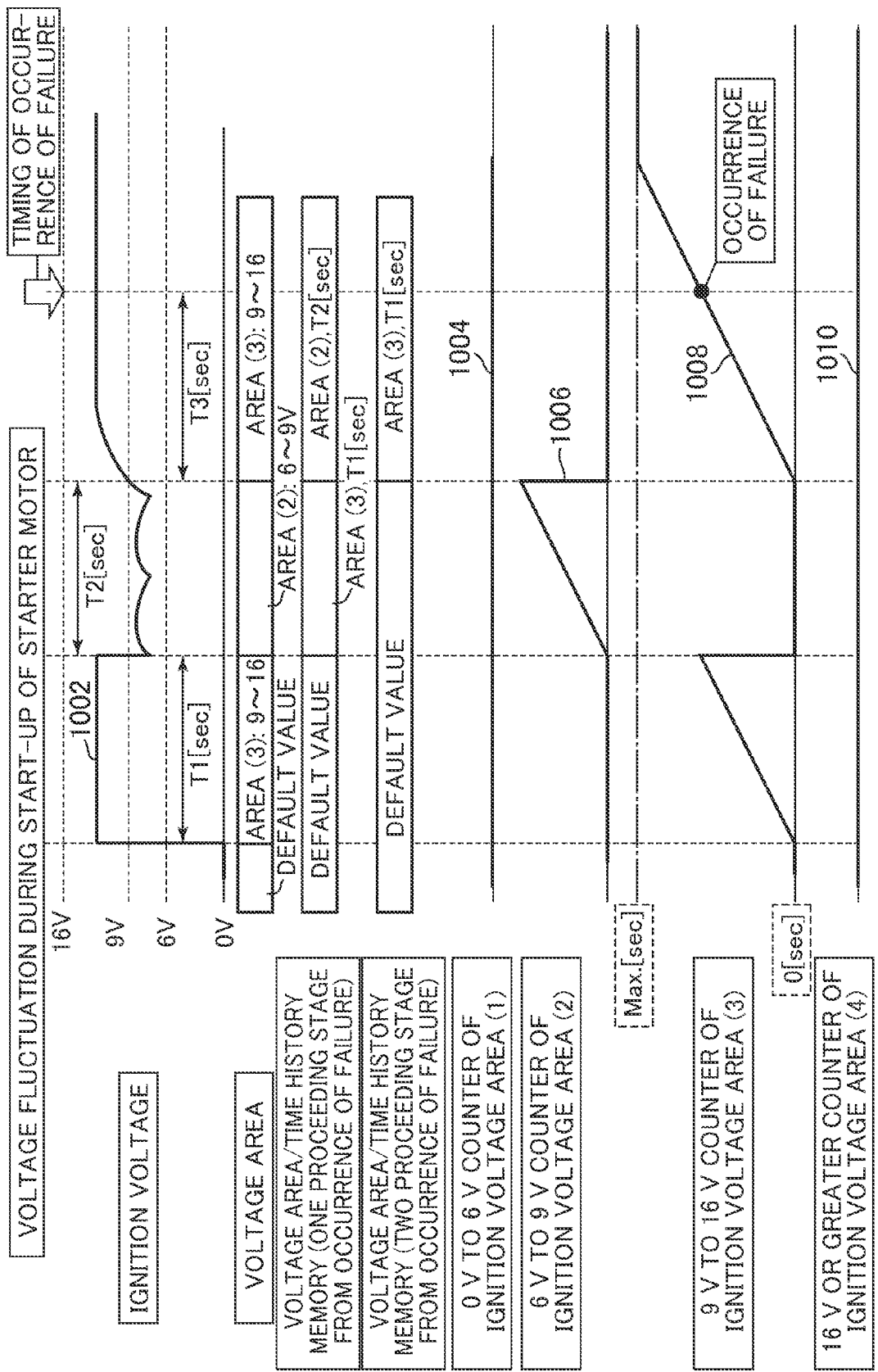

FIG. 9

| VOLTAGE AREA HISTORY/ TIME HISTORY | CONTENT OF RECORD DATA OF NON-VOLATILE MEMORY | |
|---|---|---|
| | VOLTAGE AREA | ELAPSED TIME OF VOLTAGE ARE |
| AT THE TIME OF OCCURRENCE OF FAILURE | AREA (3) | T3[sec] |
| ONE PROCEEDING STAGE FROM OCCURRENCE OF FAILURE | AREA (2) | T2[sec] |
| TWO PROCEEDING STAGE FROM OCCURRENCE OF FAILURE | AREA (3) | T1[sec] |

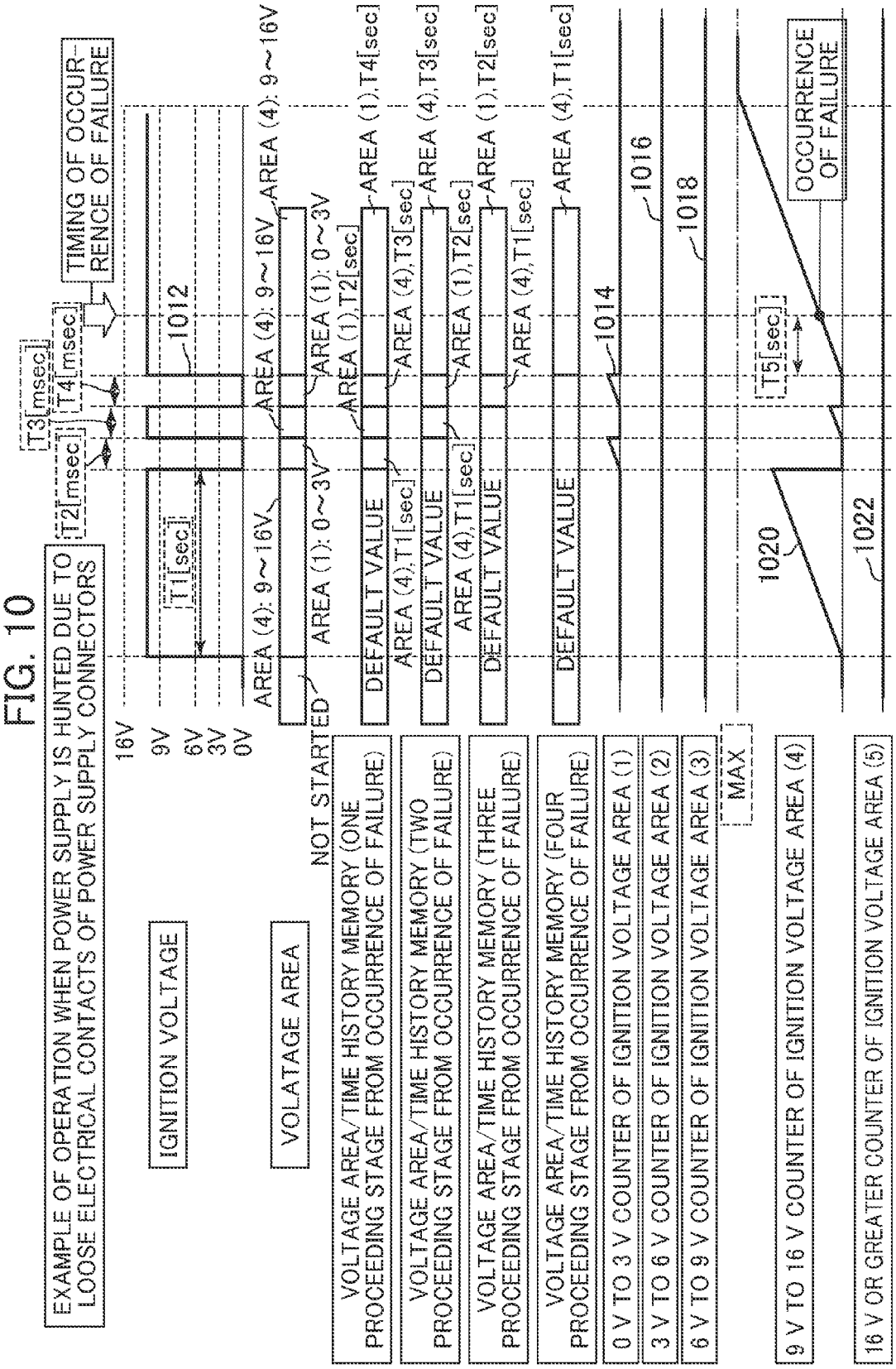

FIG. 11

| | | CONTENT OF RECORD DATA OF NON-VOLATILE MEMORY | |
|---|---|---|---|
| | | VOLTAGE AREA | ELAPSED TIME OF VOLTAGE ARE |
| VOLTAGE AREA HISTORY/TIME HISTORY | AREA AND ELAPSED TIME AT THE TIME OF OCCURRENCE OF FAILURE | AREA (4) | T5[sec] |
| | ONE PROCEEDING STAGE FROM OCCURRENCE OF FAILURE | AREA (1) | T4[msec] |
| | TWO PROCEEDING STAGE FROM OCCURRENCE OF FAILURE | AREA (4) | T3[msec] |
| | THREE PROCEEDING STAGE FROM OCCURRENCE OF FAILURE | AREA (1) | T2[msec] |
| | FOUR PROCEEDING STAGE FROM OCCURRENCE OF FAILURE | AREA (4) | T1[sec] |

FIG. 21

| | VOLTAGE RANGE TIMER | | | |
|---|---|---|---|---|
| AREA AND ELAPSED TIME AT THE TIME OF OCCURRENCE OF FAILURE | 0~5V | 5~9V | 9~16V | GREATER THAN 16 V |
| ONE PROCEEDING STAGE FROM OCCURRENCE OF FAILURE | 0[sec] | 0[sec] | ff[sec] | 0[sec] |
| TWO PROCEEDING STAGE FROM OCCURRENCE OF FAILURE | 0[sec] | gg[msec] | 0[sec] | 0[sec] |
| THREE PROCEEDING STAGE FROM OCCURRENCE OF FAILURE | 0[sec] | 0[sec] | hhh[msec] | 0[sec] |
| FOUR PROCEEDING STAGE FROM OCCURRENCE OF FAILURE | 0[sec] | i[sec] | 0[sec] | 0[sec] |
| | jj[msec] | 0[sec] | 0[sec] | 0[sec] |
| FIVE PROCEEDING STAGE FROM OCCURRENCE OF FAILURE | 0[sec] | 0[sec] | kk[sec] | 0[sec] |

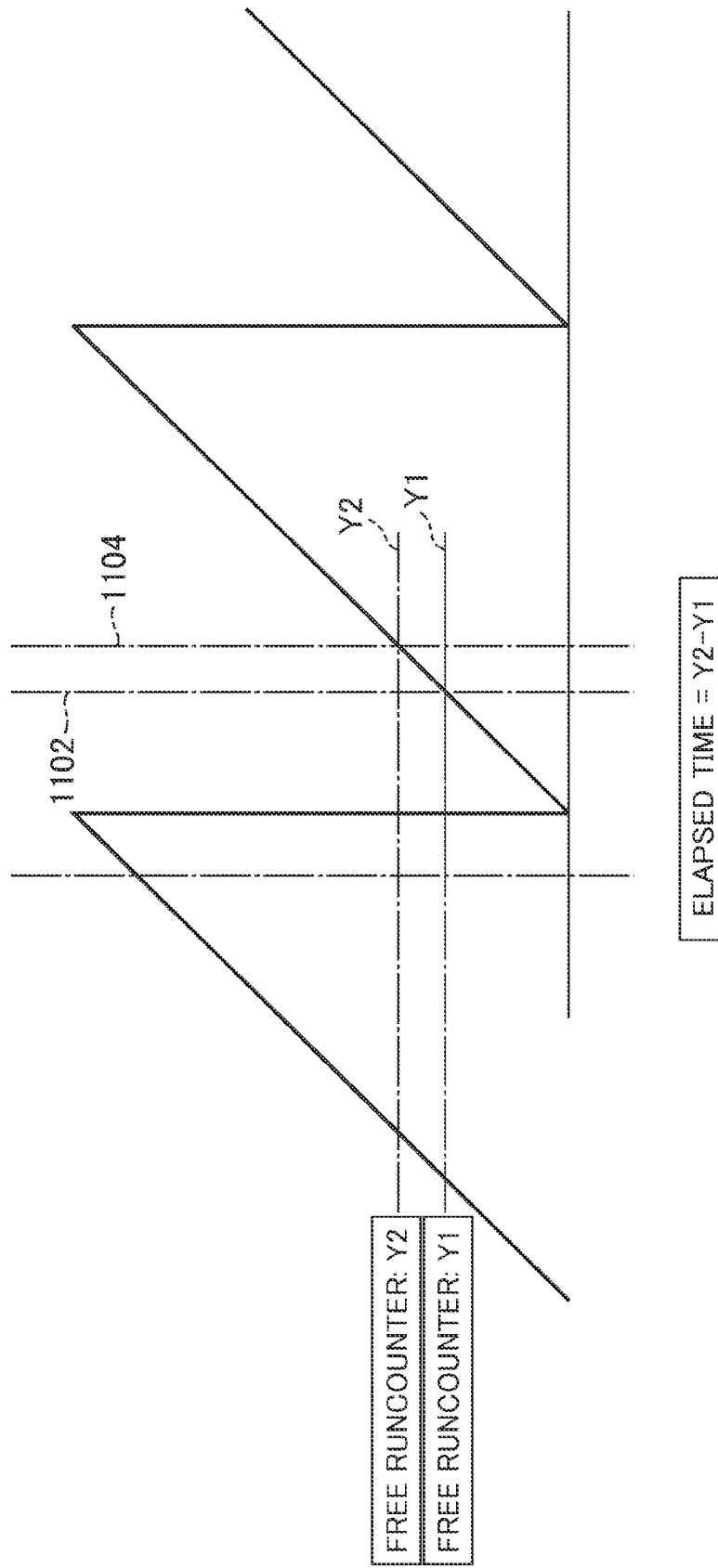

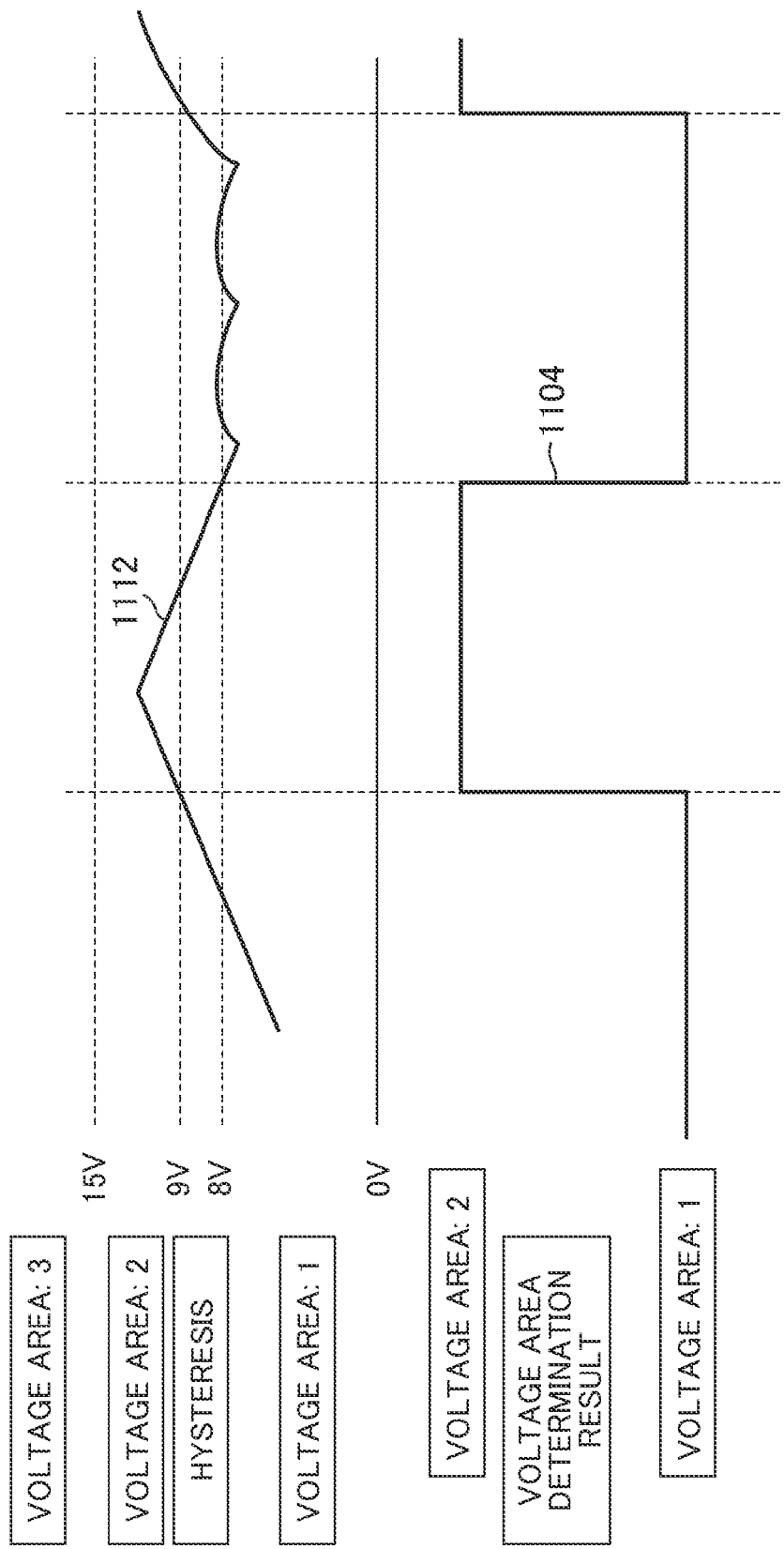

AIRBAG CONTROL UNIT

BACKGROUND OF THE INVENTION

The present invention relates to an airbag control unit.

In the related art, for example, as described in JP-A-2005-041273, vehicle control such as motor vehicle control, that obtains and records a vehicle status (freeze frame data) on a memory when a vehicle failure occurs, is known. The freeze frame data recorded on the memory are used as data for vehicle failure analysis.

In addition, in JP-A-2002-037014, there is an example of a recording of data for vehicle airbag system failure analysis. That is, a control unit of JP-A-2002-037014 periodically obtains and encodes operation conditions for the vehicle airbag system and records the latest encoded data of operation conditions on a non-volatile memory when a failure of the airbag system is detected.

In addition, JP-A-2004-291673 discloses a technology related to a drive recorder.

SUMMARY OF THE INVENTION

In the related art, when a vehicle failure occurs, vehicle status parameters (voltage in power supply, sensor data and the like) are recorded as freeze frame data. However, since the freeze frame data are not a record of time series changes of the vehicle status parameters data, it cannot be easily estimated from the freeze frame data what process the vehicle go through when the vehicle failure occurs. Since time series changes of the data are not recorded, the recorded event cannot be easily reproduced. As a result, there is a case where the cause of the failure is not easily specified so that a time to take necessary countermeasures cannot be shortened.

In addition, since the function of a drive recorder is to record statuses of a vehicle and an occupant before and after a collision for a certain time at a certain sampling period so that time series data can be recorded at a certain resolution, a status change before and after the collision can be estimated. However, since a shortened data sampling period is required to more accurately reproduce the status of the collision accident, a memory (non-volatile memory or the like) that retains the recorded data is required to be large in size and costs are increased. In addition, when the size of the memory becomes large, a physical size of the memory itself becomes large, a printed circuit board which has components mounted becomes large in planar dimension, and thus costs are increased.

In addition, CPU load in an arithmetical and logical operation is increased immediately before and after the collision event. Since the CPU load in the arithmetic and logic operation becomes heavy when the sampling period for the recorded data is shortened and thus the amount of the recorded data is increased, a CPU with a higher processing performance is required to be used, or operation frequency is required to be increased, thereby increasing costs or deteriorating EMC performance.

Various types of electronic control units (ECUs) are mounted on a vehicle. In these ECUs, there are an ECU (hereinafter, properly called a first ECU) which has a backup power supply in such a manner that the ECU can continue to be operated even when power supply from a battery power supply is interrupted, and an ECU (hereinafter, properly called a second ECU) which is operated by use of only the battery power supply.

For example, an airbag ECU, which can deploy an airbag or actuate an actuator to protect an occupant or a pedestrian even when power supply from a battery power supply is interrupted due to a vehicle collision accident, is cited as the first ECU. Other ECUs, which indirectly serve to protect an occupant or a pedestrian, for example, an ECU which detects a status of the occupant riding in a vehicle and the like, are cited as the second ECU.

The first ECU can continue to be operated by use of a backup power supply even when a battery power supply is instantaneously disconnected not to temporarily supply power due to cranking during engine start-up or poor engagements of electrical connectors. On the other hand, there is a concern that the second ECU may not operate and may be reset to restart when power is temporarily not supplied due to instantaneous disconnection of a battery power supply or the like.

In the case where the first ECU and the second ECU are communicated with each other, when a voltage in a battery power supply is transiently changed due to disconnection of a power supply or cranking during engine start-up, the first ECU continues to be operated, but the second ECU is not operated or is to be restarted. For example, when power supply is restarted after the power supply is interrupted due to instantaneous disconnection of the power supply, the first ECU continues to be operated. On the other hand, the second ECU cannot only continue to be operated, but also a CPU of the ECU is reset since power supply is restarted after the power supply is stopped and a normal operation of the second ECU is started after a certain initialization process is performed.

In this case, since the first ECU receives no response from the second ECU which is a communication partner until the normal operation of the second ECU is started from the time of the power supply being interrupted, there is a concern that the first ECU detects the second ECU, which is the communication partner, as being failed.

On the other hand, even in the case where electrical battery lines are disconnected at the time of a vehicle collision, an airbag can be deployed by the energization of a squib by use of a backup power supply in a certain backup time from the time of the electrical battery lines being disconnected, but a form of a vehicle accident occurred in practicality is not uniform and there is even a case where the backup time is exceeded before the squib is energized. In such a case, there is a concern that the vehicle is damaged from the collision accident and many failures occur. In this case, there is a problem that, if there are no records as to whether or not the electrical battery lines are normal, or how much time has elapsed from the interruption of a power supply in the case where the electrical battery lines have been already disconnected when the deployment of the airbag is determined to be required due to a vehicle collision accident, a cause, by which the deployment of the airbag by the vehicle collision could not be performed, can be hardly investigated.

A control unit of the present invention is made in light of the problem and an airbag control unit that controls an operation of an airbag apparatus is provided. The airbag control unit includes a voltage detection section that detects a voltage in a power supply supplied to the airbag control unit from a vehicle battery; a timer that measures an elapsed time after the voltage detected by the voltage detection section falls in a preset voltage range; and a recording section that records the elapsed time measured by the timer on a memory when a failure of other control units is detected.

In addition, the timer may measure elapsed times after a voltage detected by the voltage detection section falls in each of a plurality of different preset voltage ranges, and the recording section may record a plurality of elapsed times measured by the timer on the memory when a failure of the other control units is detected.

In addition, when a failure of the other control units is detected, the recording section may record histories of the plurality of elapsed times until detection of the failure, which are measured by the timer, on the memory.

In addition, the airbag control unit may further include a voltage range determination section that determines whether or not a voltage detected by the voltage detection section falls in a preset voltage range, and the timer may measure an elapsed time after the voltage is determined to fall in the preset voltage range by the voltage range determination section.

In addition, the timer may measure an elapsed time from when the voltage is determined to fall in the preset voltage range by the voltage range determination section until the voltage is determined to fall out of the preset voltage range by the voltage range determination section.

In addition, the airbag control unit may be operated by use of a first power supply which is a vehicle battery or a second power supply which is a backup power supply for the first power supply, and the other control units may be operated by use of the first power supply, and the voltage detection section may detect a voltage in the first power supply.

In addition, the second power supply may be a capacitor that stores a voltage supplied from the first power supply.

In addition, the airbag control unit may further include a communication fault detection section that detects a fault in communication with the other control units, and, when a fault in communication with the other control units is detected by the communication fault detection section, the recording section may consider a failure of the other control units as being detected.

In addition, the other control units may be control units that detect a status of an occupant riding in a vehicle.

According to the present invention, even a small amount of useful data for failure analysis may be recorded.

BRIEF DESCRIPTION OF THE DRAWINGS

FIG. 3 illustrates a first example of time sequences of operation statuses of an ignition voltage, a backup voltage, an airbag ECU and other control units (front passenger seat occupancy sensing ECU and the like).

FIG. 5 illustrates time sequences obtained by adding a counter that counts an elapsed time while an ignition voltage is normal or abnormal, to the time sequences of FIG. 3.

FIG. 7 is a second example of time sequences of operation statuses of an ignition voltage, a backup voltage, counters that count elapsed times while the ignition voltage is normal or abnormal, an airbag ECU and other control units (front passenger seat occupancy sensing ECU and the like).

FIG. 8 illustrates an example of a timing chart during the start-up of a starter motor.

FIG. 9 illustrates an example of data recorded on a non-volatile memory.

FIG. 10 illustrates an example of a timing chart when power supply connectors have loose electrical contacts.

FIG. 11 illustrates another example of data recorded on a non-volatile memory.

FIG. 21 illustrates still another example of data recorded on a memory.

FIG. 22 illustrates an example of time measurement performed by a timer.

FIG. 23 illustrates an example of a case in which a hysteresis is provided in a voltage area determination.

DETAILED DESCRIPTION

Hereinafter, an airbag control unit (airbag ECU) according to an embodiment of the present invention will be described with reference to the accompanying drawings.

Figure 1:
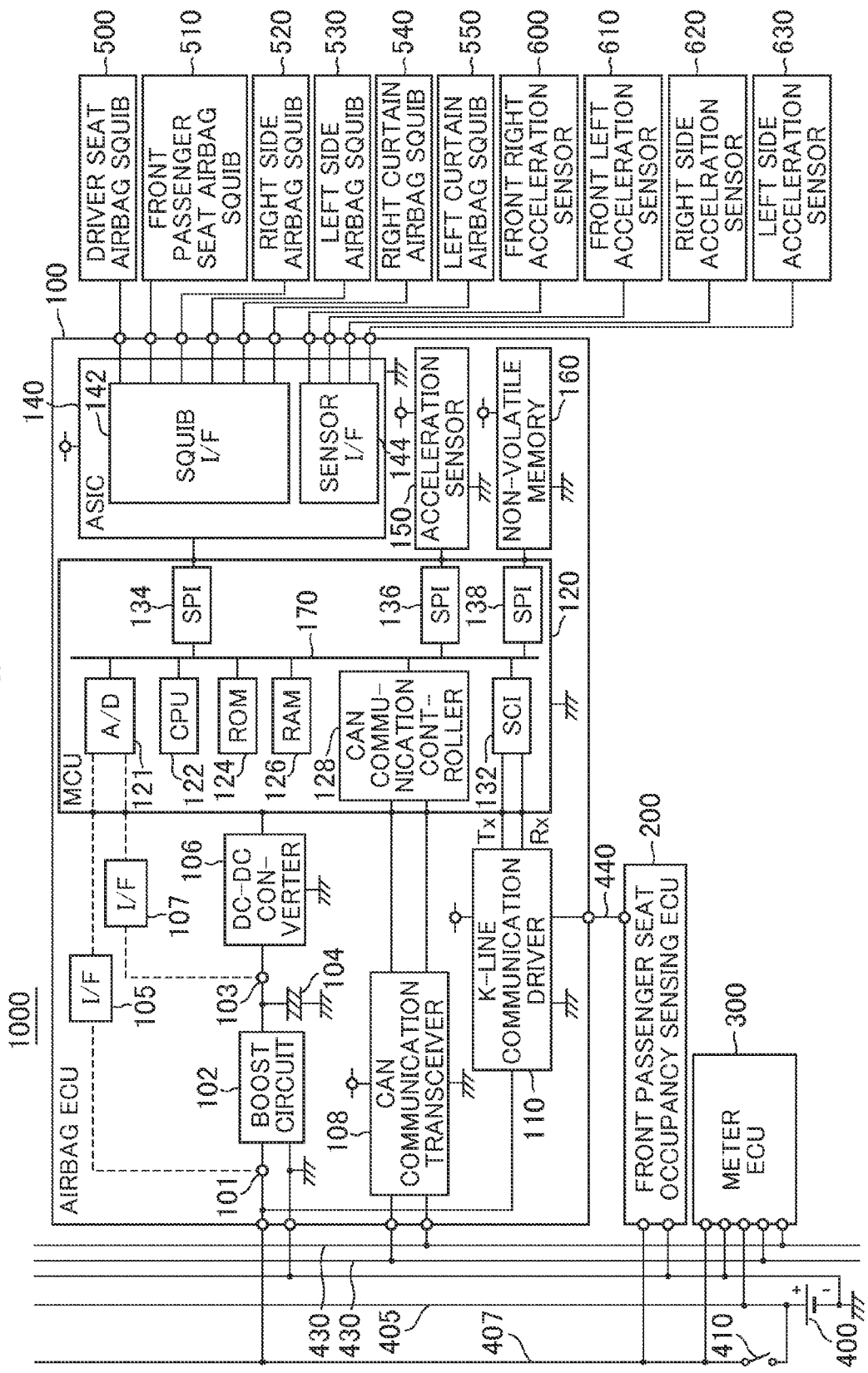
FIG. 1 illustrates a configuration of an airbag control system including an airbag ECU according to an embodiment of the present invention.

FIG. 1 illustrates a configuration of an airbag control system including the airbag ECU according to the embodiment of the present invention.

An airbag control system 1000 monitors sensor signals detected by various types of acceleration sensors provided on a vehicle and deploys an airbag in each part such as a driver seat and a front passenger seat when a vehicle collision is determined to occur, thereby improving safety of occupants if the vehicle is in collision.

As illustrated in FIG. 1, the airbag control system 1000 includes an airbag ECU (control unit) 100, a front passenger seat occupancy sensing ECU (one of other control units) 200, a meter ECU (one of other control units) 300, a battery power supply (a first power supply) 400 and an ignition switch 410.

In addition, the airbag control system 1000 includes a driver seat airbag squib 500, a front passenger seat airbag squib 510, a right side airbag squib 520, a left side airbag squib 530, a right curtain airbag squib 540 and a left curtain airbag squib 550.

In addition, the airbag control system 1000 includes a front right acceleration sensor 600, a front left acceleration sensor 610, a right side acceleration sensor 620 and a left side acceleration sensor 630.

Hereinafter, each part of the airbag control system 1000 will be described.

The battery power supply 400 is one of various types of storage batteries such as a lead storage battery mounted on a vehicle. The battery power supply 400 directly supplies power to the meter ECU 300 via a power supply line 405 and directly supplies power to various types of other components of the vehicle via the power supply line 405.

The ignition switch 410 is a switch for starting or turning off an engine of the vehicle. When the engine of the vehicle is turned off, the ignition switch 410 is set to be "OFF". When a user turns a key with the engine being turned off, the ignition switch 410 is set to be "ON". When the ignition switch 410 is set to be "ON", the battery power supply 400 supplies power to the meter ECU 300, the front passenger seat occupancy sensing ECU 200 and the airbag ECU 100 via a power supply line 407.

The meter ECU 300 is a control unit that detects and records a vehicle speed of the vehicle and transmits the recorded vehicle speed to the airbag ECU 100 or other components of the vehicle. The meter ECU 300 transmits the recorded vehicle speed to the airbag ECU 100 via CAN communication lines 430. Accordingly, the airbag ECU 100 can detect a status of the vehicle being driven, for example, a status of vehicle brakes being applied.

The front passenger seat occupancy sensing ECU 200 detects a weight on the front passenger seat of the vehicle and determines a status of the occupancy of the front passenger seat. For example, the front passenger seat occupancy sensing ECU 200 determines whether the front passenger seat is occupied by an adult man, a small woman, a child or is vacant. The front passenger seat occupancy sensing ECU 200 transmits the determined status of the front passenger seat occupancy to the airbag ECU 100 via a communication line 440. For example, the airbag ECU 100 monitors a status of the occupancy of the front passenger seat, and thus a front passenger seat airbag not illustrated can be suppressed from being deployed at the time of a front-impact vehicle collision if an occupant in the front passenger seat is a child.

The airbag ECU 100 includes a voltage detector 101, a boost circuit 102, a voltage detector 103, a capacitor (a second power supply) 104, voltage detection I/Fs 105 and 107, a DC-DC converter 106, a controller area network (CAN) communication transceiver 108 and a K-line communication driver 110. In addition, the airbag ECU 100 includes a micro controller unit (MCU) 120, an application specific integrated circuit (ASIC) 140, an acceleration sensor 150 and a nonvolatile memory 160.

The voltage detector 101 detects a voltage value on a power supply supplied to the airbag ECU 100 from the battery power supply 400 via the ignition switch 410. In the end, the voltage detector 101 detects a voltage in the power supply to the front passenger seat occupancy sensing ECU 200 and the meter ECU 300.

The voltage detection interface (I/F) 105 is an interface that outputs a voltage signal detected by the voltage detector 101 to the MCU 120. The voltage signal detected by the voltage detector 101 is output to the MCU 120 via the voltage detection I/F 105.

The boost circuit 102 is a circuit that boosts a voltage in a power supply supplied to the airbag ECU 100 from the battery power supply 400 via the ignition switch 410. For example, the boost circuit 102 boosts 9 V to 16 V of voltage in the supplied power supply to a range of 24 V. The boost circuit 102 supplies the boosted voltage to the capacitor 104 and the DC-DC converter 106.

The voltage detector 103 detects a voltage value on the power supply output from the boost circuit 102.

The voltage detection I/F 107 is an interface that outputs a voltage signal detected by the voltage detector 103 to the MCU 120. The voltage signal detected by the voltage detector 103 is output to the MCU 120 via the voltage detection I/F 107.

The capacitor 104 is a capacitor that charges and discharges a voltage supplied from the boost circuit 102 and is a backup power supply for the battery power supply 400.

The DC-DC converter 106 is a converter that converts (steps down) the voltage supplied from the boost circuit 102 to a voltage (for example, 5V) which can be used by the MCU 120. The DC-DC converter 106 supplies the step-down voltage to the MCU 120.

The CAN communication transceiver 108 is an interface that, in accordance with a CAN standard, transmits and receives data between the MCU 120 and, the meter ECU 300 and other ECUs of the vehicle not illustrated via the CAN communication line 430. The data received by the CAN communication transceiver 108 are transmitted to the MCU 120.

The K-line communication driver 110 is an interface that transmits and receives data between the MCU 120 and the front passenger seat occupancy sensing ECU 200 via the communication line 440. The K-line communication driver 110 converts a voltage level of a communication signal. For example, the K-line communication driver 110 converts 5 V of signals level handled by the MCU 120 to a voltage level (12 V) of the K-line.

The MCU 120 includes an analog to digital (A/D) converter 121, a central processing unit (CPU) 122, a read only memory (ROM) 124, a random access memory (RAM) 126 and a CAN communication controller 128. In addition, the MCU 120 includes a serial communication interface (SCI) 132 and serial peripheral interfaces (SPIs) 134, 136 and 138.

The A/D converter 121, the CPU 122, the ROM 124 the RAM 126, the CAN communication controller 128, the SCI 132 and the SPIs 134, 136 and 138 are connected with each other via an internal bus 170 of the MCU 120.

The A/D converter 121 converts an analog voltage signal input via the voltage detection I/Fs 105 and 107 to a digital voltage signal.

The CPU 122 is an arithmetical and logical processing unit that executes various types of programs stored in the ROM 124 or the RAM 126. The CPU 122 executes the various types of programs stored in the ROM 124 or the RAM 126, thereby executing various types of functions of the airbag ECU 100. The various types of functions of the airbag ECU 100 will be described later in detail.

The ROM 124 is a memory that stores data for executing the various types of functions of the airbag ECU 100 and the various types of programs for executing the various types of functions of the airbag ECU 100.

In addition, the RAM 126 is a high-speed access memory with a relatively small capacity that stores arithmetical and logical operation results of programs executed by the CPU 122 in the various types of programs stored in the ROM 124.

The CAN communication controller 128 is a controller that communicates with the meter ECU 300 or other components of the vehicle via the CAN communication transceiver 108.

The SCI 132 is an asynchronous serial communication interface and an interface between the K-line communication driver 110 and each device inside the MCU 120.

The SPI 134 is a clock-synchronous serial communication interface and an interface between the ASIC 140 and each device inside the MCU 120. The SPI 136 is an interface between the acceleration sensor 150 and each device inside the MCU 120. The SPI 138 is an interface between the non-volatile memory 160 and each device inside the MCU 120.

The acceleration sensor 150 is a sensor that detects an acceleration in an area in which the airbag ECU 100 is arranged. The acceleration sensor 150 outputs the detected acceleration to the MCU 120 via the SPI 136.

The non-volatile memory 160 is a memory that retains a record even without power being supplied and, for example, is an electrically erasable programmable read only memory (EEPROM). For example, data output from the MCU 120 via the SPI 138 are recorded on the non-volatile memory 160.

The ASIC 140 is an integrated circuit obtained by integrating multi-functional circuits on a single chip. The ASIC 140 includes a squib interface (I/F) 142 and a sensor I/F 144.

The squib I/F 142 is an interface that transmits airbag deployment signals to the driver seat airbag squib 500, the front passenger seat airbag squib 510, the right side airbag squib 520, the left side airbag squib 530, the right curtain airbag squib 540 and the left curtain airbag squib 550.

In addition, the sensor I/F 144 is an interface that receives acceleration signals transmitted from the front right acceleration sensor 600, the front left acceleration sensor 610, the right side acceleration sensor 620 and the left side acceleration sensor 630.

Based on a deployment signal transmitted from the MCU 120 via the squib I/F 142, the driver seat airbag squib 500 allows a current to flow to an ignition device (squib) on the driver-seat side and ignites a gas generating agent, thereby generating a high-pressure gas and inflating the airbag in an instant.

In addition, based on deployment signals transmitted from the MCU 120, the front passenger seat airbag squib 510, the right side airbag squib 520, the left side airbag squib 530, the right curtain airbag squib 540 and the left curtain airbag squib 550 similarly inflate an airbag arranged in each area of the vehicle.

The front right acceleration sensor 600 is an acceleration sensor arranged on the front right side of the vehicle and transmits an acceleration detected by the sensor to the MCU 120 via the sensor I/F 144.

In addition, similarly, the front left acceleration sensor 610, the right side acceleration sensor 620 and the left side acceleration sensor 630 are arranged in each area of the vehicle and detect an acceleration in each area of the vehicle to transmit the acceleration to the MCU 120.

Figure 2:
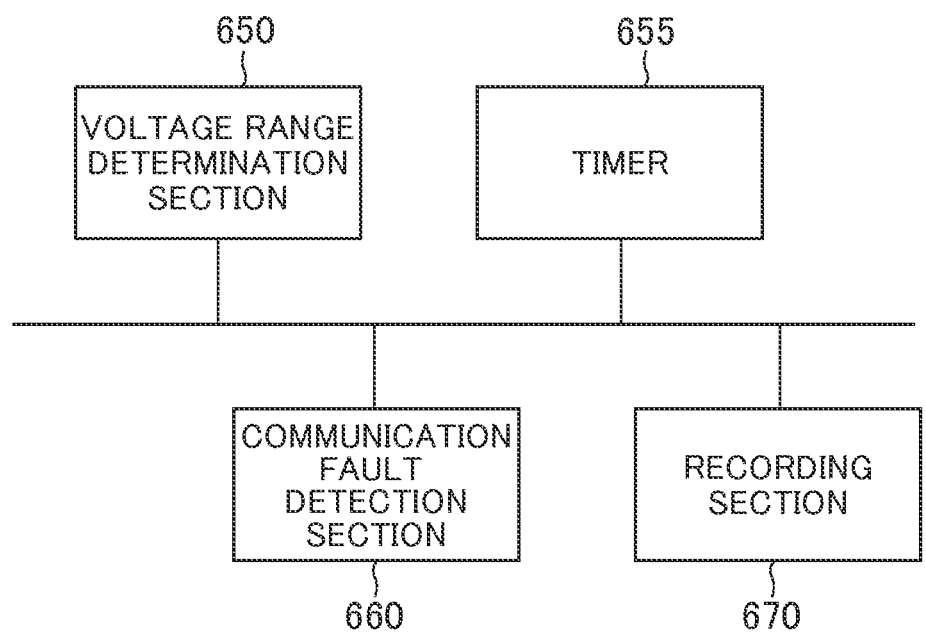
FIG. 2 illustrates blocks of functions executed by the control unit.

Subsequently, various types of function blocks of the airbag ECU 100, which are executed by the CPU 122 provided inside the MCU 120 of the airbag ECU 100, will be described. FIG. 2 illustrates blocks of functions executed by the control unit.

As illustrated in FIG. 2, the CPU 122 includes, as function blocks, a voltage range determination section 650, a timer 655, a communication fault detection section 660 and a recording section 670.

The voltage range determination section 650 determines whether or not a voltage detected by the voltage detector 101 falls in a preset voltage range. For example, the voltage range determination section 650 determines whether a voltage detected by the voltage detector 101 is in a range of 0 V to 5 V, or in a range of 5 V to 9 V, or in a range of 9 V to 16 V, or equal to or greater than 16V.

The timer 655 measures an elapsed time after a voltage detected by the voltage detector 101 falls in a preset voltage range. More specifically, the timer 655 measures an elapsed time after a voltage detected by the voltage detector 101 is determined to fall in a preset voltage range by the voltage range determination section 650. In addition, the timer 655 measures elapsed times after a voltage detected by the voltage detector 101 falls in each of a plurality of different preset voltage ranges. For example, the timer 655 measures elapsed times after the voltage range determination section 650 determines whether a voltage detected by the voltage detector 101 is in a range of 0 V to 5 V, or in a range of 5 V to 9 V, or in a range of 9 V to 16 V, or equal to or greater than 16 V, respectively. However, the voltage ranges described above are merely an example of the setting of voltage ranges. The voltage ranges can be properly set following the aforementioned examples. When a measured elapsed time reaches a preset maximum threshold value, the timer 655 can stop the measurement of elapsed time to retain the measured elapsed time at that point. A maximum threshold value and resolution of elapsed time, the setting of voltage ranges and the like may be properly set depending on function, performance, accuracy and reliability required for a unit.

The communication fault detection section 660 detects a fault in communication with other control units (for example, front passenger seat occupancy sensing ECU 200 or meter ECU 300). For example, the communication fault detection section 660 detects a communication fault in communication with the front passenger seat occupancy sensing ECU 200 when there is no communication response returned from the front passenger seat occupancy sensing ECU 200. In addition, for example, the communication fault detection section 660 detects a communication fault in communication with the meter ECU 300 when there is no communication response returned from the meter ECU 300. A method of detecting a failure of other control units is not limited to a method of detecting a failure of the other control units when there is no communication response returned from the other control units. For example, when other control units (for example, front passenger seat occupancy sensing ECU 200) detect a failure thereof, the front passenger seat occupancy sensing ECU 200 can notify the airbag ECU 100 of the failure via communication means. For example, the front passenger seat occupancy sensing ECU 200 can notify the airbag ECU 100 of a status of front passenger seat occupancy when the front passenger seat occupancy sensing ECU 200 has no failure, and the front passenger seat occupancy sensing ECU 200 can notify the airbag ECU 100 of a failure when the failure of the front passenger seat occupancy sensing ECU 200 is detected.

When a failure of other control units (for example, front passenger seat occupancy sensing ECU 200 or meter ECU 300) is detected, the recording section 670 records elapsed times measured by the timer 655 on a memory (for example, non-volatile memory 160). For example, when the communication fault detection section 660 detects a fault in communication with the front passenger seat occupancy sensing ECU 200 or the meter ECU 300, the recording section 670 records a plurality of elapsed times measured by the timer 655 on the memory. More specifically, when a failure of the front passenger seat occupancy sensing ECU 200 or the meter ECU 300 is detected, the recording section 670 records histories of the plurality of elapsed times until detection of the failure, which are measured by the timer 655, on the memory. In addition, the recording section 670 can record each of elapsed times measured for the plurality of different voltage ranges, corresponding to each of the plurality of different voltage ranges.

According to the embodiment, when a failure is detected, elapsed times measured by the timer 655 are recorded on the memory and thus a power supply voltage data are not recorded as instantaneous data but can be information on how much time has elapsed in any voltage range. As a result, even a small amount of progress, which are useful for setting conditions of failure analysis, reproduction test or the like, can be recorded. That is, since time series transition of the power supply voltage until the occurrence of the failure can be comprehended, even small amount of progress data until the occurrence of the failure are recorded so that the process data can be useful for failure analysis.

Herein, a first example of how the airbag ECU 100 and other ECUs are operated in association with changes in an ignition power supply voltage will be described. FIG. 3 illustrates the first example of time sequences of operation statuses of an ignition voltage, a backup voltage, an airbag ECU and other control units (front passenger seat occupancy sensing ECU and the like). In FIG. 3, the front passenger seat occupancy sensing ECU 200 will be described as an example of the other control units.

As illustrated in FIG. 3, a voltage (ignition voltage 702) of the battery power supply 400 detected by the voltage detector 101 makes a transition in an on and off mode due to impact of instantaneous disconnection of the power supply or the like. In this case, depending on the on and off of the ignition voltage 702, a backup voltage 704 detected by the voltage detector 103 is charged and discharged to make a transition as illustrated in FIG. 3.

In this case, the status of the front passenger seat occupancy sensing ECU 200 becomes an initialization status 710 due to an initial rising of the ignition voltage 702 and then becomes a normal operation status 712, but the status of the front passenger seat occupancy sensing ECU 200 becomes a system stop status 714 due to instantaneous disconnection of the ignition voltage 702. In addition, when the ignition voltage 702 recovers from the instantaneous disconnection, the status of the front passenger seat occupancy sensing ECU 200 becomes a normal operation status 718 via an initialization status 716. However, when the ignition voltage 702 is instantaneously disconnected, the status of the front passenger seat occupancy sensing ECU 200 becomes a system stop status 720 again. When the ignition voltage 702 recovers from the instantaneous disconnection, the status of the front passenger seat occupancy sensing ECU 200 makes a transition to a normal operation status 724 via an initialization status 722.

In addition, as illustrated in FIG. 3, an operation status of the airbag ECU 100 becomes an initialization status 706 due to the initial rising of the ignition voltage 702 and, thereafter, becomes a normal operation status 708 even when the ignition voltage 702 is instantaneously disconnected since the backup voltage 704 is charged.

Figure 4A:
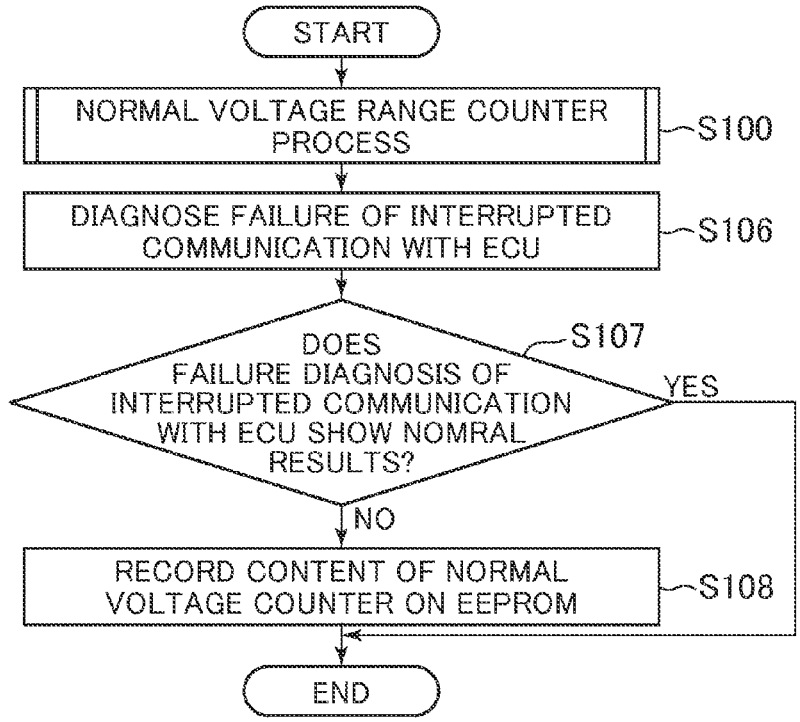
FIG. 4A illustrates a flow chart of the first example of controls executed by the control unit.
Figure 4B:
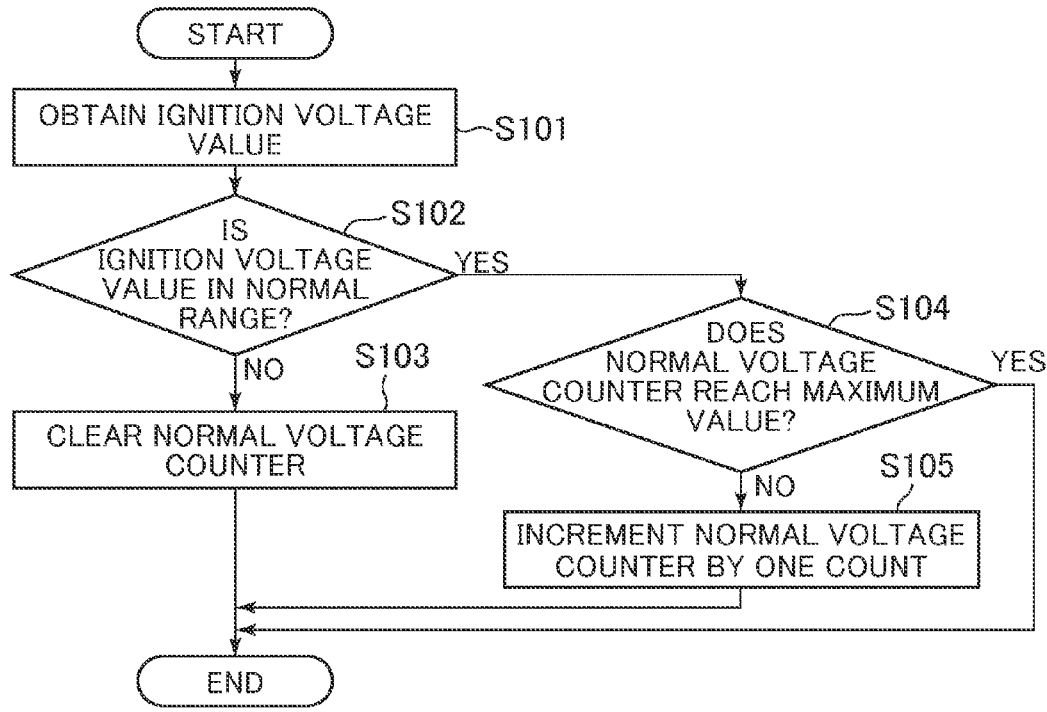
FIG. 4B illustrates another flow chart of the first example of controls executed by the control unit.

Subsequently, the timer 655 will be described in detail with reference to FIGS. 4A and 4B, 5. FIGS. 4A and 4B illustrate flow charts of the first example of controls executed by the control unit (airbag ECU 100). FIG. 5 illustrates time sequences obtained by adding a counter that counts an elapsed time while an ignition voltage is normal, to the time sequences of FIG. 3. Herein, 9 V to 16 V of the ignition voltage is considered to be a normal range, and other voltage ranges than the normal range are considered to be abnormal ranges.

As illustrated in FIG. 4A, first, a normal voltage range counter process is performed (step 100). Herein, the normal voltage range counter process will be described in detail with reference to FIG. 4B. When the normal voltage range counter process is started, the voltage range determination section 650 obtains an ignition voltage (step S101), and, subsequently, the voltage range determination section 650 determines whether or not the ignition voltage is in a normal range (step S102). Subsequently, when the ignition voltage is determined not to be in the normal range (No in step S102), as illustrated FIG. 5, the timer 655 clears a normal voltage counter 742 (step S103).

On the other hand, when the ignition voltage is in the normal range (Yes in step S102), the timer 655 determines whether or not the normal voltage counter 742 reaches a maximum value 744 (step S104).

When the normal voltage counter 742 is determined not to reach the maximum value 744 (No in step S104), the timer 655 increments the normal voltage counter 742 by one count (step S105).

As illustrated in FIG. 5, the timer 655 counts the normal voltage counter 742 by such a control.

Returning to FIG. 4A, after the normal voltage counter 742 is cleared in step S103, or after the normal voltage counter 742 is determined to reach the maximum value 744 in step S104, or after the normal voltage counter 742 is incremented by one count in step S105, the communication fault detection section 660 diagnoses a failure of interruption of communication with the front passenger seat occupancy sensing ECU 200 (step S106).

Subsequently, the communication fault detection section 660 determines whether or not the failure diagnosis of the interruption of communication with the front passenger seat occupancy sensing ECU 200 shows a normal result (step S107). More specifically, when there is communication response from the front passenger seat occupancy sensing ECU 200 in communication with the front passenger seat occupancy sensing ECU 200, the communication fault detection section 660 determines that the failure diagnosis of the interruption of communication with the front passenger seat occupancy sensing ECU 200 shows a normal result. On the other hand, when there is no communication response from the front passenger seat occupancy sensing ECU 200 in communication with the front passenger seat occupancy sensing ECU 200, the communication fault detection section 660 determines that the failure diagnosis of the interruption of communication with the front passenger seat occupancy sensing ECU 200 shows an abnormal result.

When the failure diagnosis of the interruption of communication with the front passenger seat occupancy sensing ECU 200 shows an abnormal result (No in step S107), the recording section 670 records content of the normal voltage counter 742 on the non-volatile memory (EEPROM) 160 (step S108) and ends the process.

On the other hand, when the failure diagnosis of the interruption of communication with the front passenger seat occupancy sensing ECU 200 shows a normal result (Yes in step S107), the recording section 670 ends the process at once. According to the embodiment described above, since the normal voltage counter 742 is set to be recorded when the failure diagnosis of the interruption of communication with the front passenger seat occupancy sensing ECU 200 shows an abnormal result, it can be determined whether or not there is a problem with the power supply when the front passenger seat occupancy sensing ECU 200 is determined to be abnormal. For example, when the value of the normal voltage counter is 0, the front passenger seat occupancy sensing ECU 200 can be estimated to be in a system stop status. For this reason, it can be estimated that the front passenger seat occupancy sensing ECU 200 cannot perform communication. When the value of the normal voltage counter is smaller than a threshold value illustrated in FIG. 5, the front passenger seat occupancy sensing ECU 200 can be estimated to be in an initialization status. For this reason, it can be estimated that the front passenger seat occupancy sensing ECU 200 does not start communication. When the value of the normal voltage counter is equal to or greater than the threshold value illustrated in FIG. 5, the front passenger seat occupancy sensing ECU 200 can be estimated to be in a normal operation status. In this case, it can be estimated that a failure of the communication line 440 between the airbag ECU and the front passenger seat occupancy sensing ECU 200 occurs.

Figure 6A:
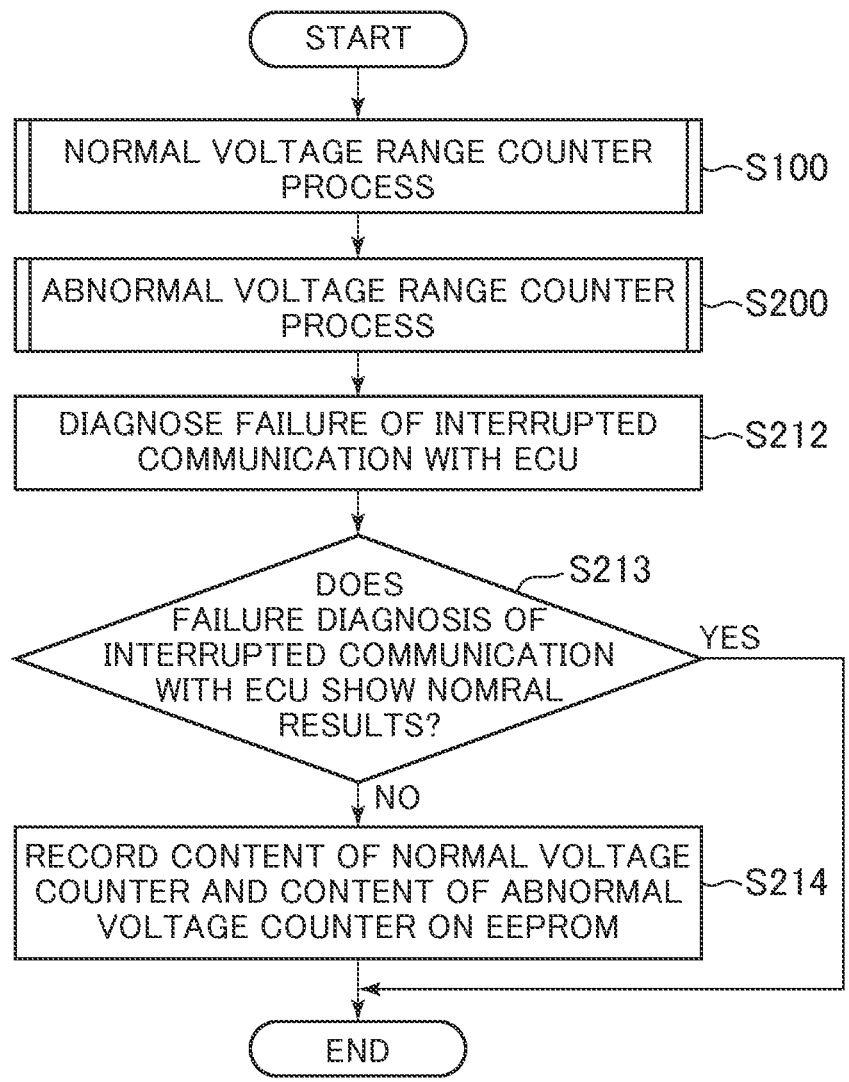
FIG. 6A illustrates a flow chart of a second example of controls executed by the control unit.
Figure 6B:
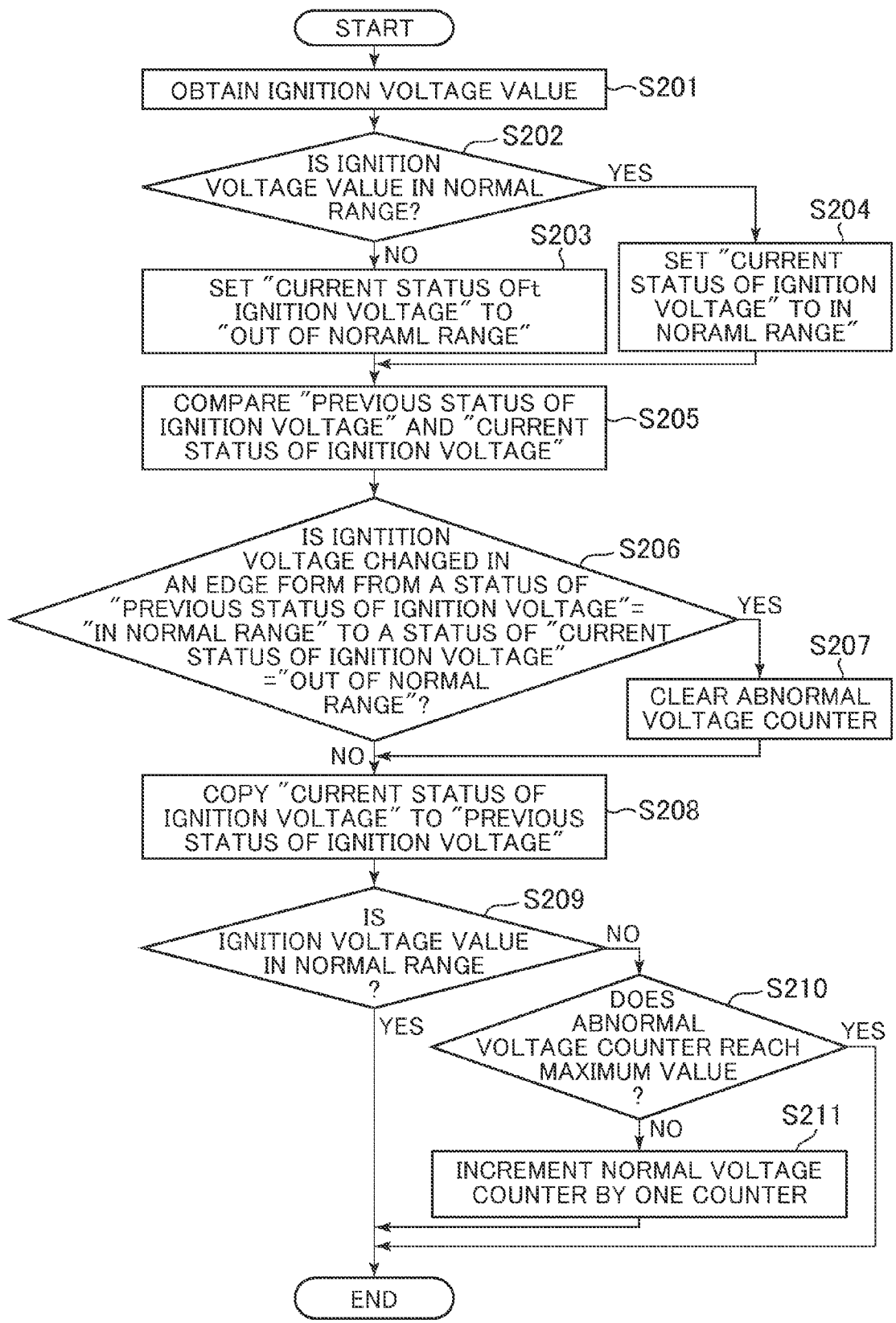
FIG. 6B illustrates another flow chart of the second example of controls executed by the control unit.

Subsequently, the timer 655 will be described even more in detail with reference to FIGS. 6A and 6B, and 7. FIGS. 6A and 6B illustrate flow charts of a second example of controls executed by the control unit (airbag ECU 100). FIG. 7 is a second example of time sequences of operation statuses of an ignition voltage, a backup voltage, counters that counts elapsed times while the ignition voltage is normal or abnormal, an airbag ECU and other control units (front passenger seat occupancy sensing ECU and the like). In FIG. 7, the front passenger seat occupancy sensing ECU 200 will be described as an example of the other control units. The second example of the time sequences is an example in which a plurality of elapsed times of voltage ranges are measured.

In the second example of the time sequences, as illustrated in FIG. 7, a voltage (ignition voltage 802) of the battery power supply 400 detected by the voltage detector 101 makes a transition in an on and off mode due to impact of instantaneous disconnection, and, thereafter, an airbag is deployed with disconnection of the ignition line due to collision of a vehicle. In this case, a backup voltage 804 detected by the voltage detector 103 is charged and discharged depending on the on and off of the ignition voltage 802 and is decreased to be in a discharged status after the vehicle collision.

In this case, an operation status of the airbag ECU 100 becomes an initialization status 806 due to an initial rising of the ignition voltage 802 and, thereafter, becomes a normal operation status 808 even when the ignition voltage 802 is instantaneously disconnected since the backup voltage 804 is charged. When the backup voltage 804 is discharged to be in a discharged status after the vehicle collision, the operation status of the airbag ECU 100 becomes a system stop status 810.

On the other hand, the status of the front passenger seat occupancy sensing ECU 200 becomes an initialization status 812 due to the initial rising of the ignition voltage 802 and then becomes a normal operation status 814. However, the status of the front passenger seat occupancy sensing ECU 200 becomes a system stop status 816 due to instantaneous disconnection of the ignition voltage 802. In addition, when the ignition voltage 802 recovers from the instantaneous disconnection, the status of the front passenger seat occupancy sensing ECU 200 becomes a normal operation status 820 via an initialization status 818. However, when the ignition voltage 802 is interrupted due to the vehicle collision, the status of the front passenger seat occupancy sensing ECU 200 becomes a system stop status 822 again.

In such the time sequences, first, a normal voltage range counter process is performed (step S100) as illustrated in FIG. 6A. Since the step S100 is the same as described in FIG. 4B, the detailed description thereof will be omitted. Subsequently, an abnormal voltage range counter process is performed (step S200). Herein, the abnormal voltage range counter process will be described in detail with reference to FIG. 6B. When the abnormal voltage range counter process is started, the voltage range determination section 650 obtains an ignition voltage (step S201). Subsequently, the voltage range determination section 650 determines whether or not the ignition voltage is in a normal range (for example, 9 V to 16 V) (step S202). Subsequently, when the ignition voltage is not in the normal range (No in step S202), the timer 655 sets "current status of ignition voltage" to "out of normal range" (step S203).

On the other hand, when the ignition voltage is in the normal range (Yes in step S202), the timer 655 sets "current status of ignition voltage" to "in normal range" (stepS204).

Subsequently, the timer 655 compares "previous status of ignition voltage" and "current status of ignition voltage" (step S205).

Subsequently, the timer 655 determines whether or not the ignition voltage is changed in a shape of edge from a status of "previous status of ignition voltage"="in normal range" to a status of "current status of ignition voltage"="out of normal range" (step S206).

When it is determined that the ignition voltage is changed in a shape of edge from a status of "previous status of ignition voltage"="in normal range" to a status of "current status of ignition voltage"="out of normal range" (Yes in step S206), the timer 655 clears an abnormal voltage counter 832 as illustrated in FIG. 7 (step S207).

After it is determined that the ignition voltage is not changed in a shape of edge from a status of "previous status of ignition voltage"="in normal range" to a status of "current status of ignition voltage"="out of normal range" in step S206 or after the abnormal voltage counter 832 is cleared in step S207, the timer 655 copies "current status of ignition voltage" to "previous status of ignition voltage" (step S208).

Subsequently, the voltage range determination section 650 determines whether or not the ignition voltage is in the normal range (for example, 9 V to 16 V) (step S209).

When the ignition voltage is determined not to be in the normal range (for example, 9 V to 16 V) (No in step S209), the timer 655 determines whether or not an abnormal voltage counter 832 reaches a maximum value (step S210).

When the abnormal voltage counter 832 is determined not to reach the maximum value (No in step S210), the timer 655 increments the abnormal voltage counter 832 by one count (step S211).

Returning to FIG. 6A, after the ignition voltage is determined to be in the normal range in step S209, or after the abnormal voltage counter 832 is determined to reach the maximum value in step S210, or after the abnormal voltage counter 832 is incremented by one count in step S211, the communication fault detection section 660 diagnoses a failure of interruption of communication with the front passenger seat occupancy sensing ECU 200 (step S212).

Subsequently, the communication fault detection section 660 determines whether or not the failure diagnosis of the interruption of communication with the front passenger seat occupancy sensing ECU 200 shows a normal result (step S213). More specifically, when there is communication response from the front passenger seat occupancy sensing ECU 200 in communication with the front passenger seat occupancy sensing ECU 200, the communication fault detection section 660 determines that the failure diagnosis of the interruption of communication with the front passenger seat occupancy sensing ECU 200 shows a normal result. On the other hand, when there is no communication response from the front passenger seat occupancy sensing ECU 200 in communication with the front passenger seat occupancy sensing ECU 200, the communication fault detection section 660 determines that the failure diagnosis of the interruption of communication with the front passenger seat occupancy sensing ECU 200 shows an abnormal result.

When the failure diagnosis of the interruption of communication with the front passenger seat occupancy sensing ECU 200 shows an abnormal result (No in step S213), the recording section 670 records content of the normal voltage counter 842 and content of the abnormal voltage counter 832 on the non-volatile memory (EEPROM) 160 (step S214) and ends the process.

On the other hand, when the failure diagnosis of the interruption of communication with the front passenger seat occupancy sensing ECU 200 shows a normal result (Yes in step S213), the recording section 670 ends the process at once.

The control unit (airbag ECU 100) of the embodiment is set to measure and record not only an elapsed time after a voltage in the battery power supply 400 falls in a normal range as illustrated in the first example but also an elapsed time after a voltage in the battery power supply 400 falls in an abnormal range. Accordingly, failure analysis can be performed using an elapsed time while other control units are in a normal status. Therefore, according to the embodiment, when a failure of the other ECUs occurs, a status of a power supply can be more accurately recorded compared to the first example, and thus even small amount of useful data for the failure analysis, for example, data as to whether or not the power supply is related to the failure, can be recorded for investigation of cause of the failure.

Subsequently, voltage fluctuation during the start-up of a starter motor, transition of a voltage area, transition of a voltage area/time history memory and transition of each counter will be described. FIG. 8 illustrates an example of a timing chart during the start-up of a starter motor.

As illustrated in FIG. 8, during the start-up of a starter motor, an ignition voltage 1002 rises from 0 V to a range of 9 V to 16 V. After T1 second elapses, the ignition voltage 1002 pulsates in a range of 6 V to 9 V for T2 second and, thereafter, stabilizes in a range of 9 V to 16 V. Herein, when T3 second elapses in a range of 9 V to 16 V, a failure of other ECUs (for example, front passenger seat occupancy sensing ECU 200) is considered to be detected.

In this case, a voltage area makes a transition in a sequence of an area (3) (9 V to 16 V), an area (2) (6 V to 9 V) and an area (3) (9 V to 16 V).

In addition, the voltage area/time history memory (at one proceeding stage from occurrence of failure) makes a transition in a sequence of a default value, the area (3) (T1 second) and the area (2) (T2 second). In addition, the voltage area and time history memory (two proceeding stage from occurrence of failure) makes a transition in a sequence of the default value and the area (3) (T1 second). In addition, a 0 V to 6 V counter 1004 of an ignition voltage area (1) remains constant at 0.

In addition, a 6 V to 9 V counter 1006 of an ignition voltage area (2) counts up for T2 second when the ignition voltage pulsates in a range of 6 V to 9 V and becomes 0 when the ignition voltage falls out of a range of 6 V to 9 V.

In addition, a 9 V to 16 V counter 1008 of an ignition voltage area (3) counts up for T1 second when the ignition voltage falls in a range of 9 V to 16 V and becomes 0 when the ignition voltage falls out of a range of 9 V to 16 V. Thereafter, the 9 V to 16 V counter 1008 of the ignition voltage area (3) counts up to a preset threshold value (Max (second)) while the ignition voltage falls in a range of 9 V to 16 V again. In addition, a 16 V or greater counter 1010 of an ignition voltage area (4) remains constant at 0.

In this case, such data as illustrated in FIG. 9 are recorded on the non-volatile memory 160 by the recording section 670. FIG. 9 illustrates an example of data recorded on a non-volatile memory.

As illustrated in FIG. 9, when a failure of voltage area history/time history occurs, the voltage area (3) and T3 second are recorded for a voltage area and an elapsed time of the voltage area, respectively. In addition, at one proceeding stage from the occurrence of the failure of the voltage area history/time history, the voltage area (2) and T2 second are recorded for a voltage area and an elapsed time of the voltage area, respectively. At two proceeding stage from the occurrence of the failure of the voltage area history/time history, the voltage area (3) and T1 second are recorded for a voltage area and an elapsed time of the voltage area, respectively.

Subsequently, voltage fluctuation when a power supply is hunted due to loose electrical contacts of power supply connectors, transition of a voltage area, transition of a voltage area/time history memory and transition of each counter will be described. FIG. 10 illustrates an example of a timing chart when power supply connectors have loose electrical contacts.

As illustrated in FIG. 10, when power supply connectors have loose electrical contacts, an ignition voltage 1012 rises from 0 V to a range of 9 V to 16 V and becomes 0 V for T2 millisecond after T1 second elapses. Thereafter, the ignition voltage 1012 rises from 0 V to a range of 9 V to 16 V again and becomes 0 V for T4 millisecond after T3 millisecond elapses. Thereafter, the ignition voltage 1012 rises from 0 V to a range of 9 V to 16 V again to stabilize. Herein, when T5 second elapses in a range of 9 V to 16 V, a failure of other ECUs (for example, front passenger seat occupancy sensing ECU 200) is considered to be detected.

In this case, a voltage area makes a transition in a sequence of an area (4) (9 V to 16 V), an area (1) (0 V to 3 V), the area (4) (9 V to 16 V), the area (1) (0 V to 3 V) and the area (4) (9 V to 16 V).

In addition, a voltage area/time history memory (at one proceeding stage from occurrence of failure) makes a transition in a sequence of a default value, the area (4) (9 V to 16 V), the area (1) (0 V to 3 V), the area (4) (9 V to 16 V), the area (1) (0 V to 3 V). In addition, the voltage area/time history memory (at two proceeding stage from occurrence of failure) makes a transition in a sequence of the default value, the area (4) (9 V to 16 V), the area (1) (0 V to 3 V), and the area (4) (9 V to 16 V).

In addition, the voltage area/time history memory (at three proceeding stage from occurrence of failure) makes a transition in a sequence of the default value, the area (4) (9 V to 16 V) and the area (1) (0 V to 3 V). In addition, the voltage area/time history memory (at four proceeding stage from occurrence of failure) makes a transition in a sequence of the default value and the area (4) (9 V to 16 V).

In addition, a 0 V to 3 V counter 1014 of the ignition voltage area (1) counts up for T2 millisecond when the ignition voltage falls in a range of 0 V to 3 V and becomes 0 when the ignition voltage falls out of 0 V to 3 V. In addition, the 0 V to 3 V counter 1014 of the ignition voltage area (1) counts up for T4 millisecond when the ignition voltage falls in a range of 0 V to 3 V again and becomes 0 when the ignition voltage falls out of a range of 0 V to 3 V.

In addition, a 3 V to 6 V counter 1016 of the ignition voltage area (2) remains constant at 0. In addition, a 6 V to 9 V counter 1018 of the ignition voltage area (3) remains constant at 0.

In addition, a 9 V to 16 V counter 1020 of the ignition voltage area (4) counts up for T1 second when the ignition voltage falls in a range of 9 V to 16 V and becomes 0 when the ignition voltage falls out of a range of 9 V to 16 V. Thereafter, the 9 V to 16 V counter 1020 of the ignition voltage area (4) counts up for T3 millisecond when the ignition voltage falls in a range of 9 V to 16 V and becomes 0 when the ignition voltage falls out of a range of 9 V to 16 V. Thereafter, the 9 V to 16 V counter 1020 of the ignition voltage area (4) counts up to a preset threshold value (Max (second)) while the ignition voltage falls in a range of 9 V to 16 V again. In addition, a 16 V or greater counter 1022 of an ignition voltage area (5) remains constant at 0.

In this case, such data as illustrated in FIG. 11 are recorded on the non-volatile memory 160 by the recording section 670. FIG. 11 illustrates another example of data recorded on a non-volatile memory.

As illustrated in FIG. 11, when a failure of voltage area history/time history occurs, the voltage area (4) and T5 second are recorded for a voltage area and an elapsed time of the voltage area, respectively. In addition, at one proceeding stage from the occurrence of the failure of the voltage area history/time history, the voltage area (1) and T4 millisecond are recorded for a voltage area and an elapsed time of the voltage area, respectively. In addition, at two proceeding stage from the occurrence of the failure of the voltage area history/time history, the voltage area (4) and T3 millisecond are recorded for a voltage area and an elapsed time of the voltage area, respectively. In addition, at three proceeding stage from the occurrence of the failure of the voltage area history/time history, the voltage area (1) and T2 millisecond are recorded for a voltage area and an elapsed time of the voltage area, respectively. In addition, at four proceeding stage from the occurrence of the failure of the voltage area history/time history, the voltage area (4) and T1 second are recorded for a voltage area and an elapsed time of the voltage area, respectively.

Figure 12:
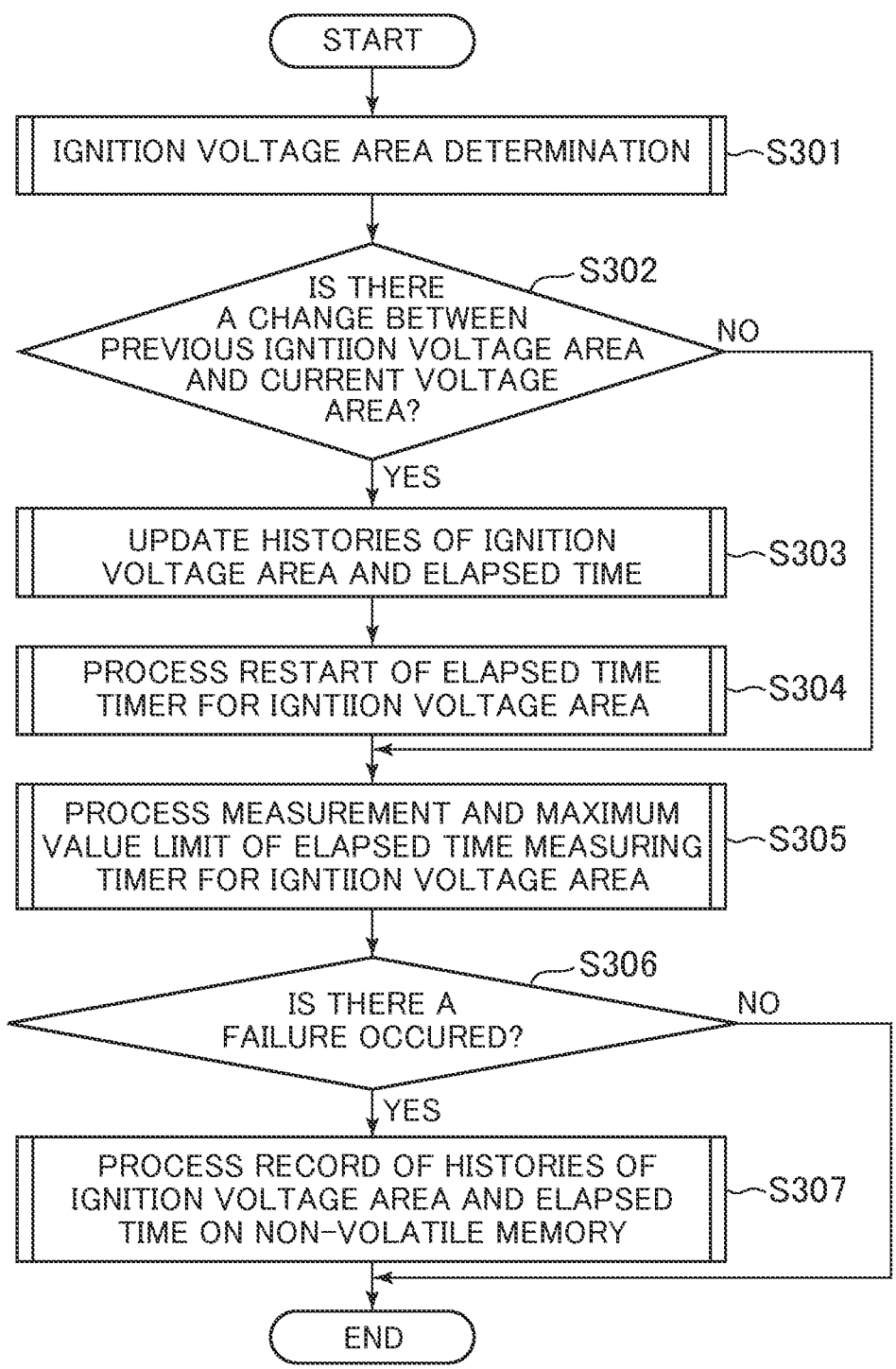
FIG. 12 illustrates a flow chart of a third example of controls executed by the airbag control unit.

Subsequently, controls executed by the airbag control unit (airbag ECU 100) will be described. FIG. 12 illustrates a flow chart of a third example of controls executed by the airbag control unit. First, in the beginning, an overall flow will be roughly described with reference to FIG. 12 and, thereafter, each process in FIG. 12 will be described in detail.

As illustrated in FIG. 12, first, the voltage range determination section 650 determines an area of an ignition voltage (step S301). Subsequently, the timer 655 determines whether or not there is a change between a previous ignition voltage area and a current voltage area (step S302).

Subsequently, when it is determined that there is a change between the previous ignition voltage area and the current ignition voltage area (Yes in step S302), the timer 655 updates histories of the ignition voltage area and an elapsed time (step S303). Subsequently, the timer 655 processes a restart of an elapsed time timer for the ignition voltage area (step S304).

After step S304 or when it is determined that there is no change between the previous ignition voltage area and the current ignition voltage area in step S302, the timer 655 processes a measurement and a maximum value limit of an elapsed time measuring timer for the ignition voltage area (step S305).

Subsequently, the communication fault detection section 660 determines whether or not a failure of other control units (for example, front passenger seat occupancy sensing ECU 200) occurs (step S306).

When a failure of the other control units (for example, front passenger seat occupancy sensing ECU 200) is determined to occur (Yes in step S306), the recording section 670 records histories of the ignition voltage area and the elapsed time are recorded on the non-volatile memory (step S307).

Figure 13:
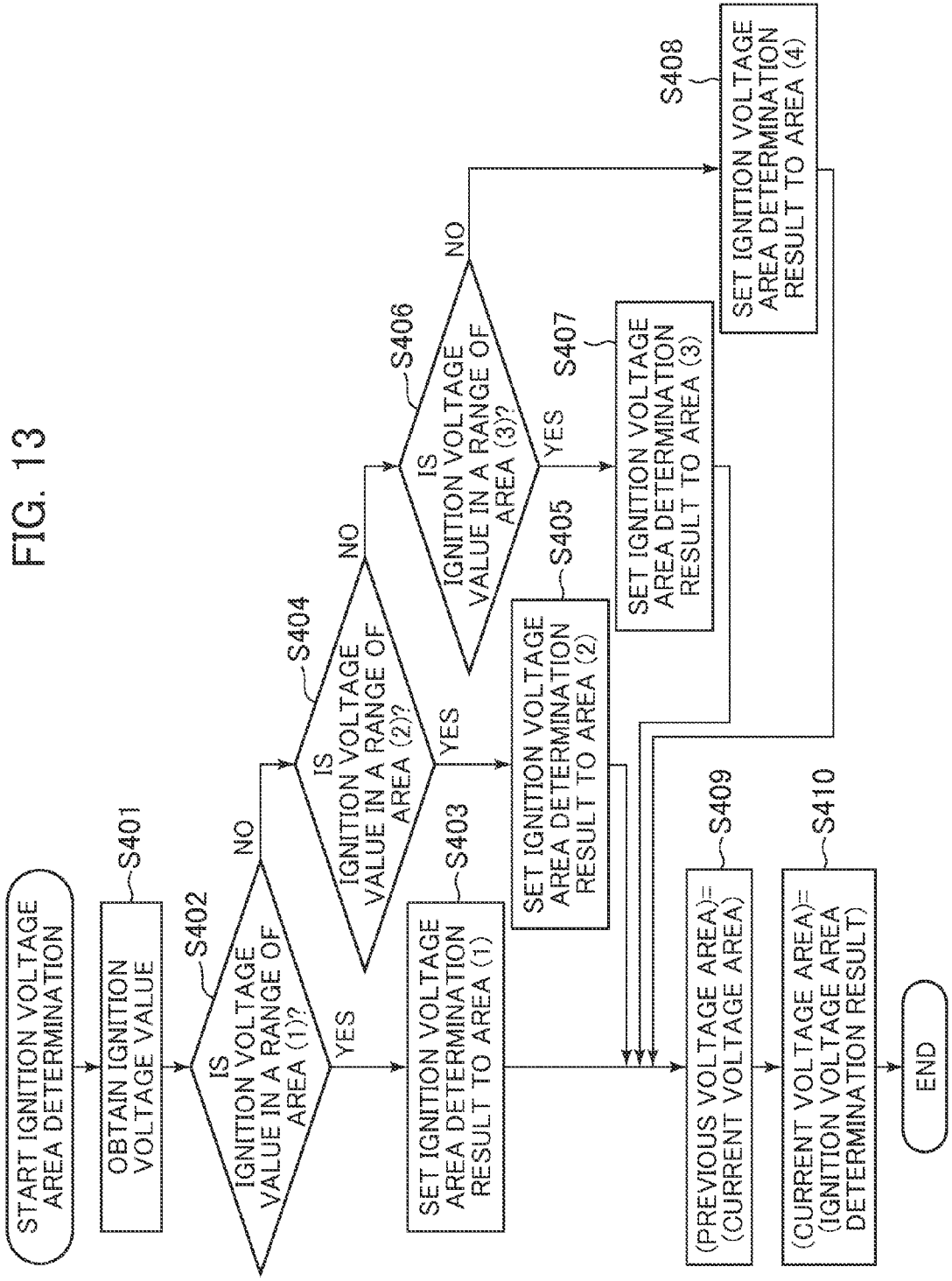
FIG. 13 illustrates a flow chart of an ignition voltage area determination.

Herein, when a voltage fluctuates during the start-up of a starter motor, a process of the ignition voltage area determination (step S301) will be described in detail. FIG. 13 illustrates a flow chart of an ignition voltage area determination.

First, the voltage range determination section 650 obtains an ignition voltage value (step S401). Subsequently, the voltage range determination section 650 determines whether or not the ignition voltage value is in a range of an area 1 (0 V to 6 V) (step S402). When the ignition voltage value is determined to be in a range of the area 1 (0 V to 6 V) (Yes in step S402), the voltage range determination section 650 sets an ignition voltage area determination result to the area 1 (step S403).

On the other hand, when the ignition voltage value is determined not to be in a range of the area 1 (0 V to 6 V) (No in step S402), the voltage range determination section 650 determines whether or not the ignition voltage value is in a range of an area 2 (6 V to 9 V) (step S404). When the ignition voltage value is determined to be in a range of the area 2 (6 V to 9 V) (Yes in step S404), the voltage range determination section 650 sets an ignition voltage area determination result to the area 2 (step S405).

When the ignition voltage value is determined not to be in a range of the area 2 (6 V to 9 V) (No in step S404), the voltage range determination section 650 determines whether or not the ignition voltage value is in a range of an area 3 (9 V to 16 V) (step S406). When the ignition voltage value is determined to be in a range of the area 3 (9 V to 16 V) (Yes in step S406), the voltage range determination section 650 sets an ignition voltage area determination result to the area 3 (step S407).

When the ignition voltage value is determined not to be in a range of the area 3 (9 V to 16 V) (No in step S406), the voltage range determination section 650 sets an ignition voltage area determination result to an area 4 (step S408).

The voltage range determination section 650 inputs a value of the current voltage area into the previous voltage area after step S403, S405, S407 or S408 (step S409). The voltage range determination section 650 inputs an ignition voltage area determination result into the current voltage area (step S410).

Figure 14:
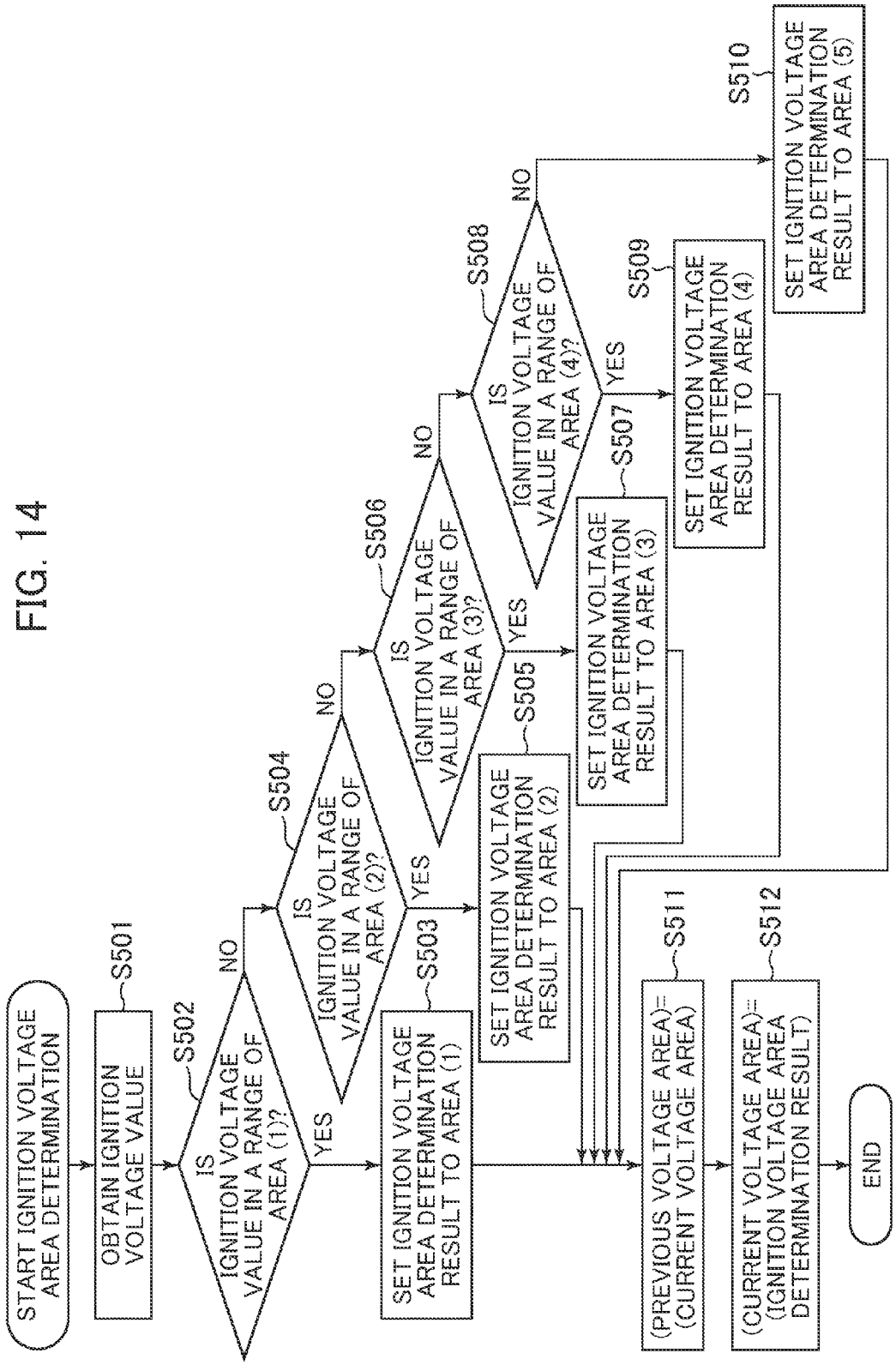
FIG. 14 illustrates another flow chart of an ignition voltage area determination.

Subsequently, when a voltage fluctuates in association with loose electrical contacts of pins of battery line connectors, the process of an ignition voltage area determination (step S301) will be described in detail. FIG. 14 illustrates another flow chart of an ignition voltage area determination.

First, the voltage range determination section 650 obtains an ignition voltage value (step S501). Subsequently, the voltage range determination section 650 determines whether or not the ignition voltage value is in a range of an area 1 (0 V to 3 V) (step S502). When the ignition voltage value is determined to be in a range of the area 1 (0 V to 3 V) (Yes in step S502), the voltage range determination section 650 sets an ignition voltage area determination result to the area 1 (step S503).

On the other hand, when the ignition voltage value is determined not to be in a range of the area 1 (0 V to 3 V) (No in step S502), the voltage range determination section 650 determines whether or not the ignition voltage value is in a range of an area 2 (3 V to 6 V) (step S504). When the ignition voltage value is determined to be in a range of the area 2 (3 V to 6 V) (Yes in step S504), the voltage range determination section 650 sets an ignition voltage area determination result to the area 2 (step S505).

When the ignition voltage value is determined not to in a range of the area 2 (3 V to 6 V) (No in step S504), the voltage range determination section 650 determines whether or not the ignition voltage value is in a range of an area 3 (6 V to 9 V) (step S506). When the ignition voltage value is determined to be in a range of the area 3 (6 V to 9 V) (Yes in step S506), the voltage range determination section 650 sets an ignition voltage area determination result to the area 3 (step S507).

When the ignition voltage value is determined not to be in a range of the area 3 (6 V to 9 V) (No in step S506), the voltage range determination section 650 determines whether or not the ignition voltage value is in a range of an area 4 (9 V to 16 V) (step S508). When the ignition voltage value is determined to be in a range of the area 4 (9 V to 16 V) (Yes in step S508), the voltage range determination section 650 sets an ignition voltage area determination result to the area 4 (step S509).

When the ignition voltage value is determined not to be in a range of the area 4 (9 V to 16 V) (No in step S508), the voltage range determination section 650 sets an ignition voltage area determination result to an area 5 (step S510).

The voltage range determination section 650 inputs a value of the current voltage area into the previous voltage area after step S503, S505, S507, S509 or S510 (step S511). The voltage range determination section 650 inputs an ignition voltage area determination result into the current voltage area (step S512).

Figure 15:
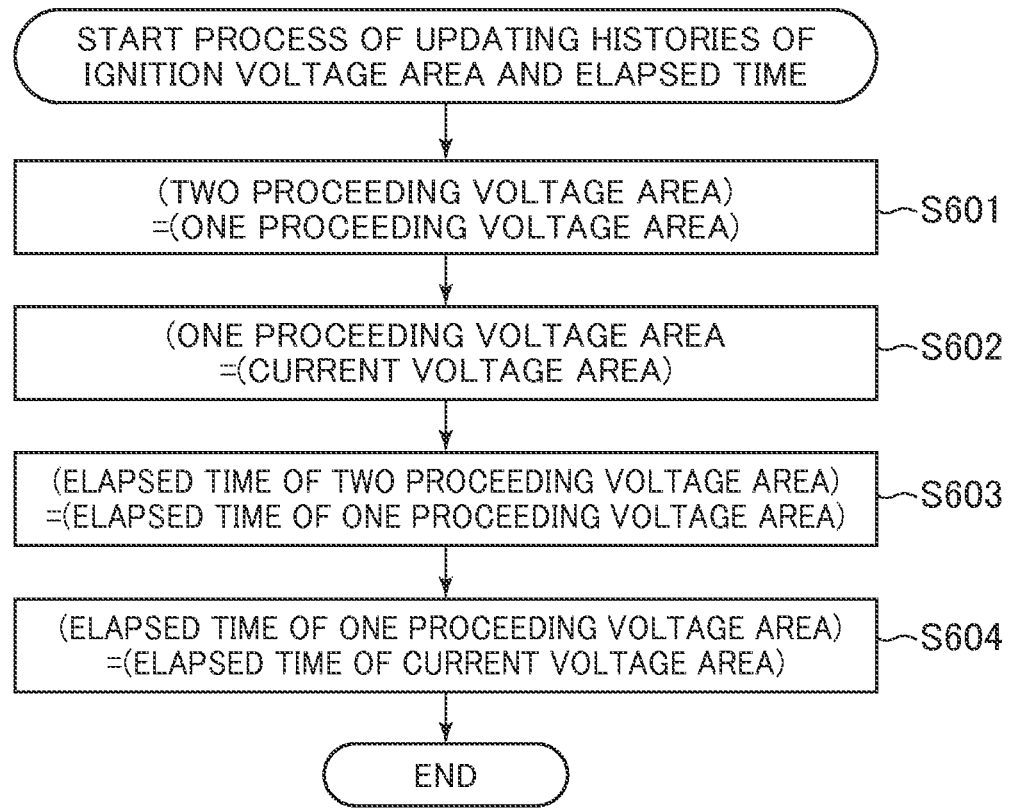
FIG. 15 illustrates a flow chart of a process of updating histories of an ignition voltage area and an elapsed time.

Subsequently, when a voltage fluctuates during the start-up of a starter motor, the process (step S303) of updating histories of an ignition voltage area and an elapsed time will be described in detail. FIG. 15 illustrates a flow chart of the process of updating histories of the ignition voltage area and the elapsed time.

First, the timer 655 inputs a value of one proceeding voltage area into two proceeding voltage area (step S601). Subsequently, the timer 655 inputs a value of the current voltage area into the one proceeding voltage area (step S602).

Subsequently, the timer 655 inputs an elapsed time of the one proceeding voltage area into the two proceeding voltage area (step S603). Subsequently, the timer 655 inputs an elapsed time of the current voltage area into an elapsed time of the one proceeding voltage area (step S604).

Figure 16:
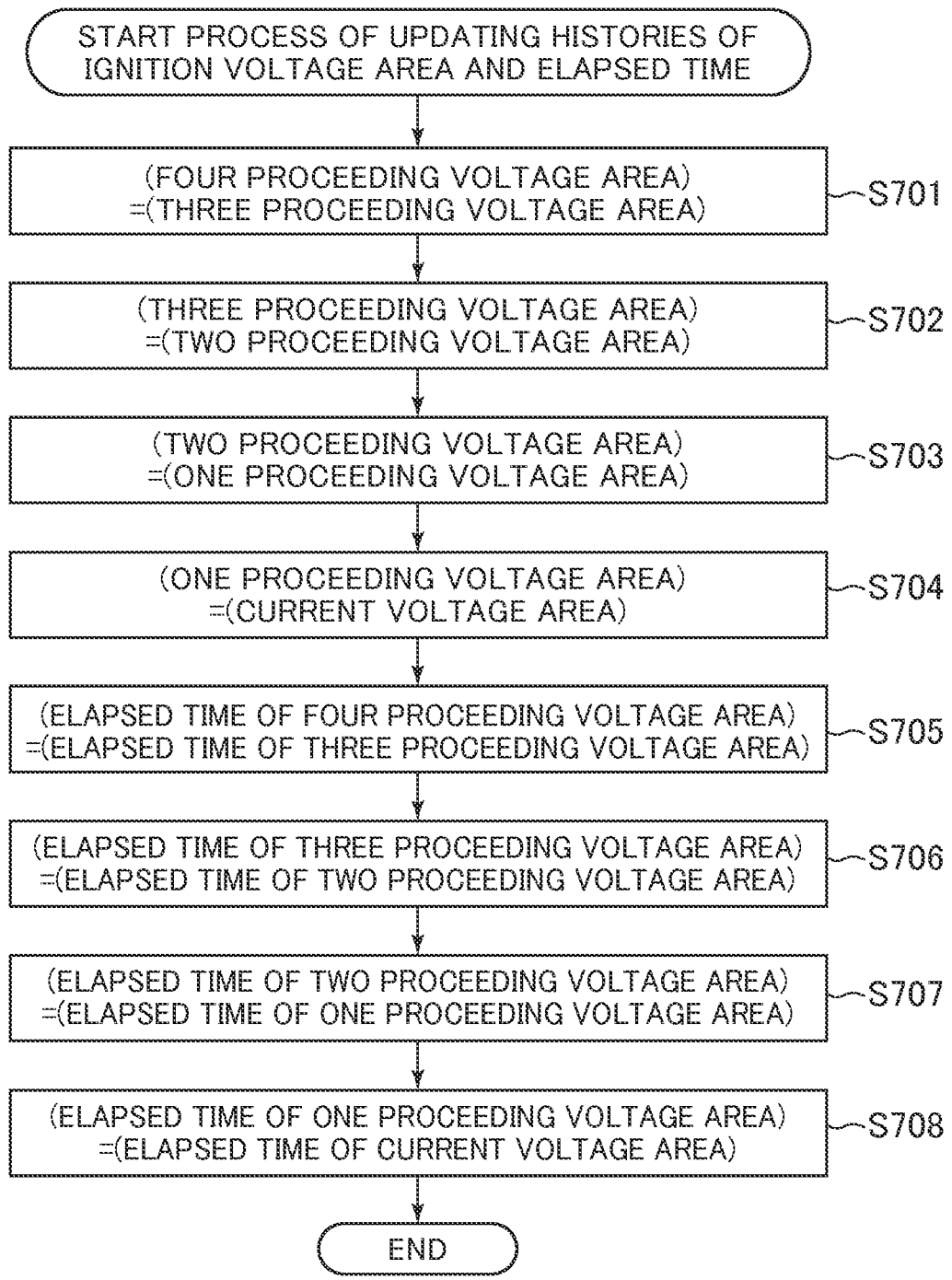
FIG. 16 illustrates another flow chart of a process of updating histories of an ignition voltage area and an elapsed time.

Subsequently, when a voltage fluctuates in association with loose electrical contacts of pins of battery line connectors, the process (step S303) of updating histories of an ignition voltage area and an elapsed time will be described in detail. FIG. 16 illustrates another flow chart of the process of updating histories of the ignition voltage area and the elapsed time.

First, the timer 655 inputs a value of three proceeding voltage area into four proceeding voltage area (step S701). Subsequently, the timer 655 inputs a value of two proceeding voltage area into the three proceeding voltage area (step S702). Subsequently, the timer 655 inputs a value of one proceeding voltage area into the two proceeding voltage area (step S703). The timer 655 inputs a value of the current voltage area into the one proceeding voltage area (step S704).

Subsequently, the timer 655 inputs an elapsed time of the three voltage area into an elapsed time of the four proceeding voltage area (step S705). Subsequently, the timer 655 inputs an elapsed time of the two proceeding voltage area into an elapsed time of the three proceeding voltage area (step S706). Subsequently, the timer 655 inputs an elapsed time of the one proceeding voltage area into an elapsed time of the two proceeding voltage area (step S707). Subsequently, the timer 655 inputs an elapsed time of the current voltage area into an elapsed time of the one proceeding voltage area (step S708).

Figure 17:
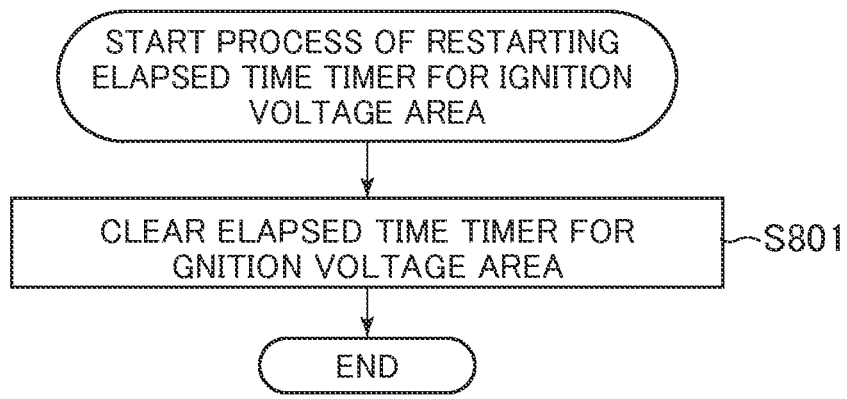
FIG. 17 illustrates a flow chart of a process of restarting an elapsed time timer for an ignition voltage area.

Subsequently, the process (step S304) of a restart of an elapsed time timer for an ignition voltage area will be described in detail. FIG. 17 illustrates a flow chart of the process of restarting the elapsed time timer for the ignition voltage area. When the process is started, the timer 655 clears the elapsed time timer for the ignition voltage area to be set to 0 (step S801).

Figure 18:
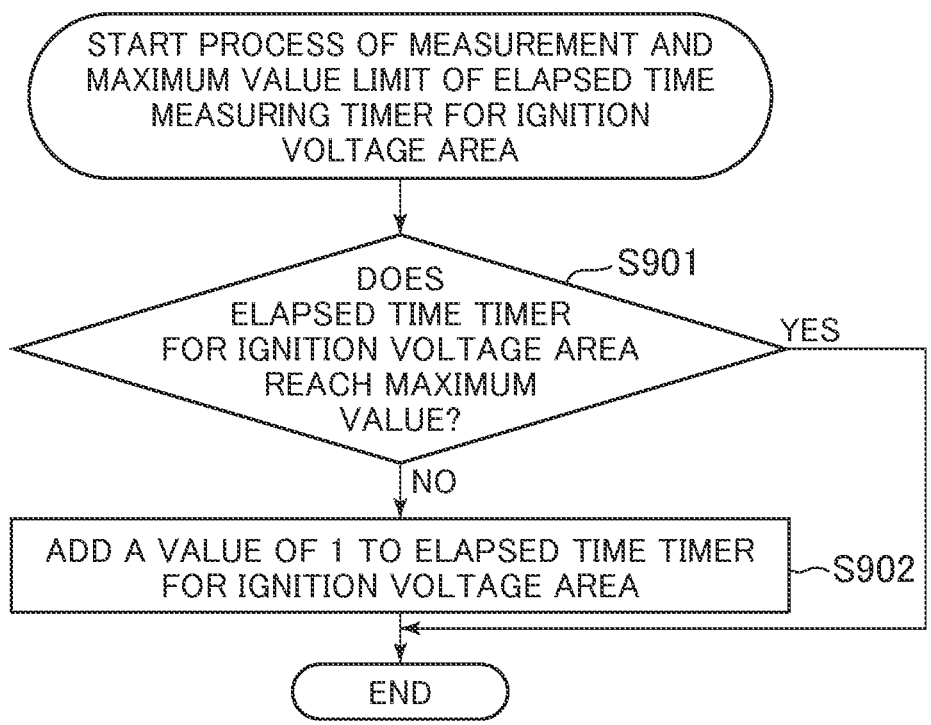
FIG. 18 illustrates a flow chart of a process of a measurement and a maximum value limit of an elapsed time measuring timer for an ignition voltage area.

Subsequently, the process (step S305) of a measurement and a maximum value limit of an elapsed time measuring timer for an ignition voltage area will be described in detail. FIG. 18 illustrates a flow chart of the process of the measurement and the maximum value limit of the elapsed time measuring timer for the ignition voltage area.

The timer 655 determines whether or not the elapsed time timer for the ignition voltage area reaches a maximum value (step S901). When the elapsed time timer for the ignition voltage area is determined to reach the maximum value (Yes in step S901), the timer 655 ends the process at once.

On the other hand, when the elapsed time timer for the ignition voltage area is determined not to reach the maximum value (No in step S901), the timer 655 adds a value of 1 to the elapsed time timer for the ignition voltage area (step S902) to end the process.

Figure 19:
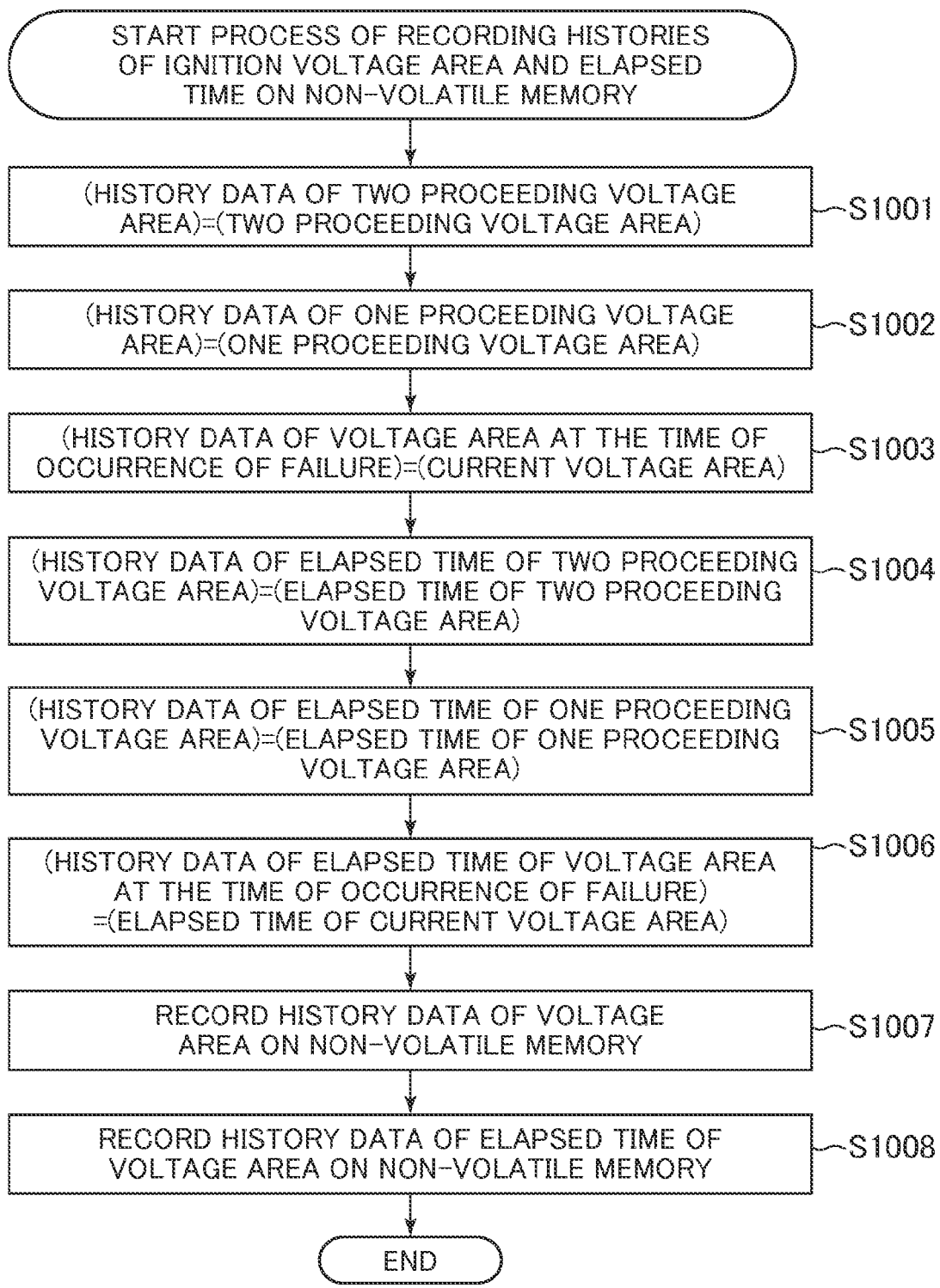
FIG. 19 illustrates a flow chart of a process of recording histories of an ignition voltage area and an elapsed time on a non-volatile memory.

Subsequently, when a voltage fluctuates during the start-up of a starter motor, the process (step S307) of recording histories of an ignition voltage area and an elapsed time on a non-volatile memory will be described in detail. FIG. 19 illustrates a flow chart of the process of recording the histories of the ignition voltage area and the elapsed time on the non-volatile memory.

The recording section 670 records a value of two proceeding voltage area on history data of the two proceeding voltage area (step S1001). Subsequently, the recording section 670 records a value of one proceeding voltage area on history data of the one proceeding voltage area (step S1002). Subsequently, the recording section 670 records a value of the current voltage area on history data of the voltage area at the time of occurrence of a failure (step S1003).

Subsequently, the recording section 670 records an elapsed time of the two proceeding voltage area on history data of an elapsed time of the two proceeding voltage area (step S1004). Subsequently, the recording section 670 records an elapsed time of the one proceeding voltage area on history data of an elapsed time of the one proceeding voltage area (step S1005). Subsequently, the recording section 670 records an elapsed time of the current voltage area on history data of an elapsed time of the voltage area at the time of the occurrence of the failure (step S1006).

Subsequently, the recording section 670 records history data of the voltage areas on the non-volatile memory 160 (step S1007). Specifically, the recording section 670 records the history data of the two proceeding voltage area, the history data of the one proceeding voltage area and the history data of the voltage area at the time of the occurrence of the failure on the non-volatile memory 160.

Subsequently, the recording section 670 records history data of the elapsed times of the voltage areas on the non-volatile memory 160 (step S1008). Specifically, the recording section 670 records the history data of the elapsed time of the two proceeding voltage area, the history data of the elapsed time of the one proceeding voltage area and the history data of the elapsed time of the voltage area at the time of the occurrence of the failure on the non-volatile memory 160.

Figure 20:
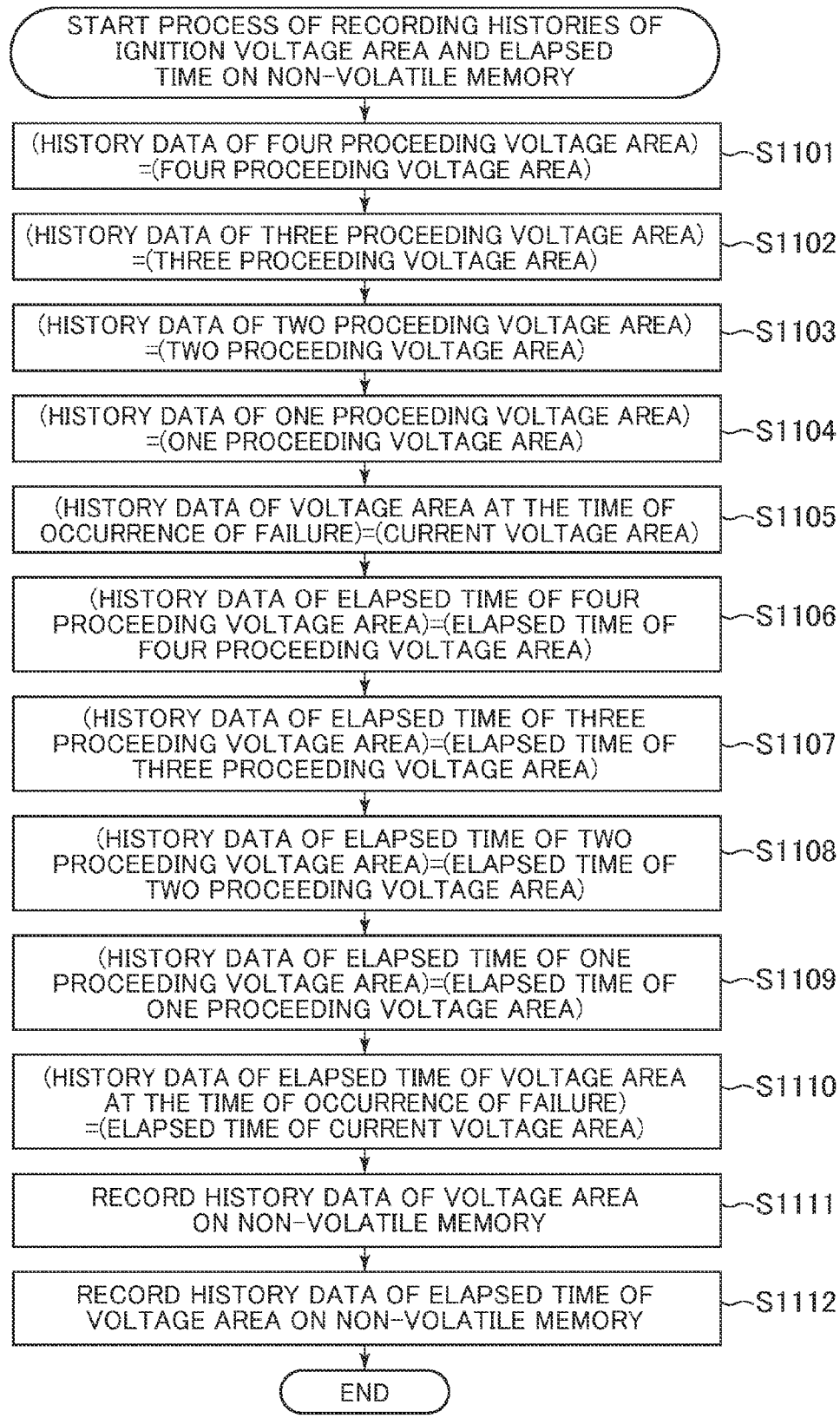
FIG. 20 illustrates another flow chart of a process of recording histories of an ignition voltage area and an elapsed time on a non-volatile memory.

Subsequently, when a voltage fluctuates in association with loose electrical contacts of pins of battery line connectors, the process (step S307) of recording histories of an ignition voltage area and an elapsed time on a non-volatile memory will be described in detail. FIG. 20 illustrates another flow chart of the process of recording the histories of the ignition voltage area and the elapsed time on the non-volatile memory.

The recording section 670 records a value of four proceeding voltage area on history data of the four proceeding voltage area (step S1101). Subsequently, the recording section 670 records a value of three proceeding voltage area on history data of the three proceeding voltage area (step S1102). Subsequently, the recording section 670 records a value of two proceeding voltage area on history data of the two proceeding voltage area (step S1103). Subsequently, the recording section 670 records a value of one proceeding voltage area on history data of the one proceeding voltage area (step S1104). Subsequently, the recording section 670 records a value of the current voltage area on history data of the voltage area at the time of occurrence of a failure (step S1105).

Subsequently, the recording section 670 records an elapsed time of the four proceeding voltage area on history data of an elapsed time of the four proceeding voltage area (step S1106). Subsequently, the recording section 670 records an elapsed time of the three proceeding voltage area on history data of an elapsed time of the three proceeding voltage area (step S1107). Subsequently, the recording section 670 records an elapsed time of the two proceeding voltage area on history data of an elapsed time of the two proceeding voltage area (step S1108). Subsequently, the recording section 670 records an elapsed time of the one proceeding voltage area on history data of an elapsed time of the one proceeding voltage area (step S1109). Subsequently, the recording section 670 records an elapsed time of the current voltage area on history data of an elapsed time of the voltage area at the time of the occurrence of the failure (step S1110).

Subsequently, the recording section 670 records the history data of the voltage areas on the non-volatile memory 160 (step S1111). Specifically, the recording section 670 records the history data of the four proceeding voltage area, the history data of the three proceeding voltage area, the history data of the two proceeding voltage area, the history data of the one proceeding voltage area and the history data of the voltage area at the time of the occurrence of the failure on the non-volatile memory 160.

Subsequently, the recording section 670 records the history data of the elapsed times of the voltage areas on the non-volatile memory 160 (step S1112). Specifically, the recording section 670 records the history data of the elapsed time of the four proceeding voltage area, the history data of the elapsed time of the three proceeding voltage area, the history data of the elapsed time of the two proceeding voltage area, the history data of the elapsed time of the one proceeding voltage area and the history data of the elapsed time of the voltage area at the time of the occurrence of the failure on the non-volatile memory 160.

As described above, according to the embodiment, since, when a failure is detected, an elapsed time of each of the plurality of different preset voltage ranges measured by the timer 655 and history of the elapsed time are recorded on a memory, even small amount of progress data can be more accurately recorded. As a result, a status of a power supply until occurrence of a failure can be reproduced, or the influence of a vehicle power supply system useful for a reproduction verification test or investigation of the failure can be made clear. The number of recording past data as history data of the elapsed time, resolution of an elapsed time counter, a voltage range segmentation and the like can be properly changed depending on environmental conditions, performance, or assumed failure modes required for a unit and memory margins. For example, the assumed failure modes and the voltage ranges can be mapped as follows; 0 V to 6 V: disconnection of a power supply line, 6 V to 9 V: low-voltage status in association with cranking during engine start-up, a failure of an alternator or the like, 9 V to 16 V: normal operation voltage range and equal to or greater than 16 V: a failure of a vehicle power supply system.

Herein, an example of data recorded on a memory by the recording section 670 will be described. FIG. 21 illustrates another example of data recorded on a memory. In the example of FIG. 21, the plurality of different voltage ranges are set to be 0 V to 5 V, 5 V to 9 V, 9 V to 16 V and 16 V or greater. The recording section 670 records an elapsed time of each voltage range at the time of occurrence of a failure, at one proceeding stage from the occurrence of the failure, at two proceeding stage from the occurrence of the failure, at three proceeding stage from the occurrence of the failure, at four proceeding stage from the occurrence of the failure and five proceeding stage from the occurrence of the failure, respectively. FIG. 21 illustrates, as an example of past history data recording, a case where history data of up to five proceeding stage from the occurrence of the failure are recorded. However, if there is an additional margin available in memory size, more past history data may be recorded. The number of the past history data recording may be properly set depending on function, performance, accuracy, reliability, memory size and the like required for a unit. Four voltage ranges are illustrated as an example of voltage ranges, but the number of the voltage ranges can be properly set depending on environmental conditions or assumed failure modes required for the unit.

In the above description, an example where the timer 655 counts up from 0 to perform time measurement is illustrated, but the embodiment of the present invention is not limited to the example. FIG. 22 illustrates an example of time measurement performed by a timer. As illustrated in FIG. 22, the timer 655 uses a free run timer and a time stamp long enough compared to events which are measurement objects, and thus the timer 655 can measure an elapsed time between two events by calculating |Y2−Y1| from time stamps (Y1, Y2) at the two events (1102, 1104). An expression of "long enough" means that a time between the two events, which are the measurement objects, is shorter than a time of a single period of a free run timer of the measurement objects. When the time between the two events exceeds the time of a single period of the free run timer, the measured time may be determined to reach a maximum value and may be limited to the maximum value.

In addition, in a voltage area determination, a hysteresis can be provided. FIG. 23 illustrates an example of a case in which a hysteresis is provided in a voltage area determination. When it is desired to avoid a case in which a voltage is recorded in such a manner that the voltage frequently steps across a voltage boundary due to voltage pulsation during cranking or the like, a hysteresis may be provided in a region of a voltage area determination. In the example of FIG. 23, a range of 8 V to 9 V is set to be a hysteresis.

In this case, when an ignition voltage 1112 becomes equal to or greater than 9 V from less than 9 V, a voltage area is determined to make a transition from a voltage area 1 to a voltage area 2. On the other hand, when the ignition voltage 1112 becomes less than 8 V from 8 V or greater, the voltage area is determined to make a transition from the voltage area 2 to the voltage area 1. Therefore, even in the case where the ignition voltage 1112 pulsates during cranking, the pulsation does not affect a voltage area determination result 1114. A width of the hysteresis, the number of voltage area segmentation and the like may be properly set depending on reliability, function, assumed failure modes and the like required for a unit.

What is claimed is:

1. An airbag control unit that controls an operation of an airbag apparatus that is operated by use of a first power supply which is a vehicle battery or by use of a second power supply which is a backup power supply for the first power supply, the unit comprising:

a voltage detection section that measures a voltage of the first power supply;

a timer that measures an elapsed time that the voltage measured by the voltage detection section falls in a preset voltage range;

a fault detection section that detects a failure of an other control unit which is different than the airbag control unit and which is operated by the first power supply; and a recording section that records the elapsed time measured by the timer on a memory when the failure of the other control unit is detected.

2. The airbag control unit according to claim 1,
wherein the timer measures a plurality of elapsed times that the voltage measured by the voltage detection section falls in each of a plurality of different preset voltage ranges, and
the recording section records the plurality of elapsed times measured by the timer on the memory when the failure of the other control unit is detected.

3. The airbag control unit according to claim 2, wherein when the failure of the other control unit is detected, the recording section records histories of the plurality of elapsed times on the memory until detection of the failure, which are measured by the timer.

4. The airbag control unit according to claim 1 further comprising:
a voltage range determination section that determines whether or not a voltage detected by the voltage detection section falls in a preset voltage range,
wherein the timer measures an elapsed time after the voltage is determined to fall in the preset voltage range by the voltage range determination section.

5. The airbag control unit according to claim 4, wherein the timer measures an elapsed time from when the voltage is determined to fall in the preset voltage range by the voltage range determination section until the voltage is determined to fall out of the preset voltage range by the voltage range determination section.

6. The airbag control unit according to claim 1, wherein the airbag control unit is operated by use of a first power supply which is a vehicle battery or a second power supply which is a backup power supply for the first power supply,
the other control unit is operated by use of the first power supply, and
the voltage detection section detects a voltage in the first power supply.

7. The airbag control unit according to claim 1, wherein the second power supply is a capacitor that stores a voltage supplied from the first power supply.

8. The airbag control unit according to claim 1 further comprising:
a communication fault detection section that detects a fault in communication with the other control unit, wherein
when a fault in communication with the other control unit is detected by the communication fault detection section, the recording section considers a failure of the other control unit as being detected.

9. The airbag control unit according to claim 1, wherein the other control unit detects a status of an occupant riding in a vehicle.

10. The airbag control unit according to claim 1, wherein the recording section records the elapsed time measured by the timer on the memory only when the fault detection section detects the failure of the other control unit.

* * * * *